United States Patent
Bag

(10) Patent No.: US 12,326,793 B2
(45) Date of Patent: Jun. 10, 2025

(54) PRESERVING ENTERPRISE ARTIFACTS USING DIGITAL TWIN TECHNOLOGY AND INTELLIGENT SMART CONTRACTS

(71) Applicant: Bank of America Corporation, Charlotte, NC (US)

(72) Inventor: Prasad Balkrishna Bag, Mumbai (IN)

(73) Assignee: Bank of America Corporation, Charlotte, NC (US)

( * ) Notice: Subject to any disclaimer, the term of this patent is extended or adjusted under 35 U.S.C. 154(b) by 246 days.

(21) Appl. No.: 17/874,884

(22) Filed: Jul. 27, 2022

(65) Prior Publication Data

US 2024/0037004 A1    Feb. 1, 2024

(51) Int. Cl.
*G06F 11/30* (2006.01)
*H04L 9/00* (2022.01)

(52) U.S. Cl.
CPC ...... *G06F 11/3079* (2013.01); *G06F 11/3075* (2013.01); *H04L 9/50* (2022.05)

(58) Field of Classification Search
CPC ..... G06F 11/3079; G06F 11/3075; H04L 9/50
See application file for complete search history.

(56) References Cited

U.S. PATENT DOCUMENTS

| | | | | |
|---|---|---|---|---|
| 2014/0156339 A1* | 6/2014 | Boyer | ................ | G06Q 10/0635 705/7.28 |
| 2017/0286572 A1 | 10/2017 | Hershey et al. | | |
| 2019/0354922 A1 | 11/2019 | Berti et al. | | |
| 2020/0295919 A1 | 9/2020 | Covaci et al. | | |
| 2020/0364387 A1* | 11/2020 | Roemerman | ........... | G06F 30/20 |
| 2021/0027186 A1* | 1/2021 | Sanchirico | .............. | H04W 4/70 |
| 2021/0089422 A1* | 3/2021 | Kim | .................... | G06F 11/3079 |
| 2022/0167142 A1* | 5/2022 | Myong | .................... | H04W 4/38 |

FOREIGN PATENT DOCUMENTS

CN    114118831 A  *  3/2022

OTHER PUBLICATIONS

Numao (JP 2022134982) (Year: 2015).*

* cited by examiner

*Primary Examiner* — Etienne P Leroux
*Assistant Examiner* — J Mitchell Curran
(74) *Attorney, Agent, or Firm* — Banner & Witcoff, Ltd.

(57) ABSTRACT

Aspects of the disclosure relate to preserving enterprise artifacts using digital twin technology and intelligent smart contracts. The computing platform may receive a stream of internal data and a stream of external data. The computing platform may compare the received internal data and the received external data to historic internal data and historic external data, respectively. The computing platform may identify inconsistencies between the received data and the historic data using a plurality of key performance indicators, and may determine a critical value for each key performance indicator. The computing platform may determine whether the key performance indicator threatens the security of the enterprise artifacts. If the computing platform determines that the key performance indicator threatens the security of the enterprise artifacts, then the computing platform may execute at least one enterprise artifact protection protocol to safeguard the enterprise artifacts.

20 Claims, 13 Drawing Sheets

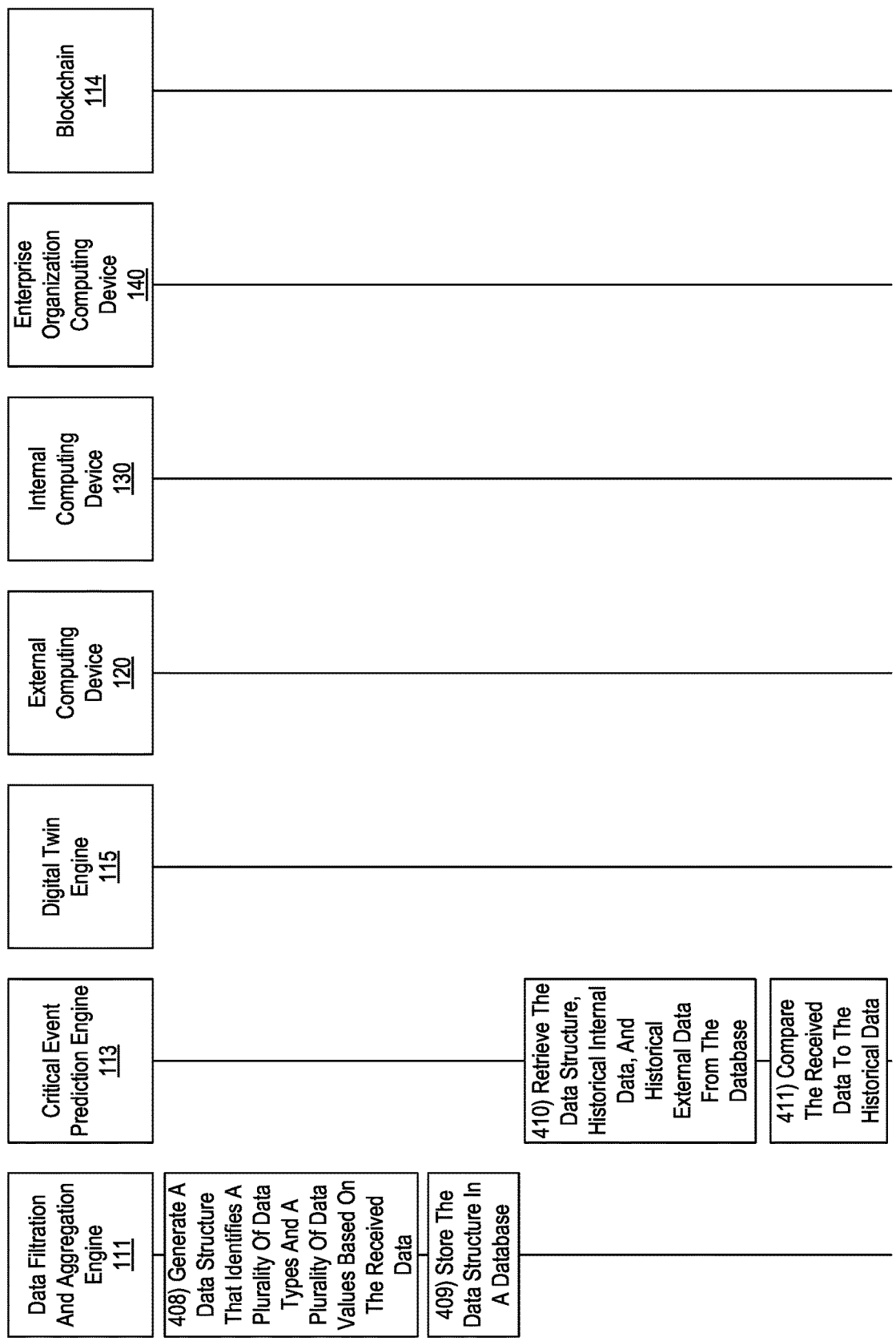

PRESERVING ENTERPRISE ARTIFACTS USING DIGITAL TWIN TECHNOLOGY AND INTELLIGENT SMART CONTRACTS

BACKGROUND

Aspects of the disclosure relate to hardware and software for preserving enterprise artifacts using digital twin technology and intelligent smart contracts. In particular, one or more aspects of the disclosure relate to monitoring external data associated with real-world conditions and internal data associated with an enterprise organization, comparing the external data and the internal data to historic external data and historic internal data to identify inconsistencies, flagging key performance indicators that identify the inconsistencies, and executing at least one enterprise artifact protection protocol based on the identified inconsistencies.

Current data retention and data protection protocols enable enterprise organizations to preserve enterprise artifacts (e.g., enterprise organization data, enterprise organization operations, enterprise organization applications, or the like) when the location where the enterprise artifacts are stored (e.g., data centers, or the like) may be compromised. In some instances, an enterprise organization may protect the enterprise artifacts within a compromised data center (e.g., may use a back-up power generator to provide power to the compromised data center while the main power source is non-operational). Over time, the data protection and/or data retrieval measures may become less effective (e.g., the back-up power generator's fuel supply may deplete after continued use) and may compromise the preservation of the enterprise artifacts. Therefore, current data retention and data protection protocols might not offer enterprise organizations a method of preserving the enterprise artifacts for an extended period of time and/or a method of transmitting the enterprise artifacts from the compromised data center to a secure location.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, and convenient technical solutions that address and overcome the technical problems associated with preserving, in real-time or near real-time, enterprise artifacts using digital twin technology and intelligent smart contracts.

In accordance with one or more embodiments, a method may comprise, at a computing device including one or more processors and memory, receiving, from a plurality of external devices, a stream of external data that includes real-world conditions. The method may comprise receiving, from a plurality of internal devices, a stream of internal data that includes conditions associated with an enterprise organization. The method may comprise parsing the external data and the internal data. The method may comprise identifying, based on the parsing, a plurality of data types and a plurality of data values that correspond to the external data and the internal data. The method may comprise determining whether the external data is consistent with historic external data. The method may comprise based on determining the external data is inconsistent with the historic external data, flagging at least one key performance indicator. The method may comprise determining at least one critical value that corresponds to the at least one flagged key performance indicator. The method may comprise determining whether the at least one flagged key performance indicator corresponds to at least one enterprise artifact protection protocol. The method may comprise based on determining that the at least one flagged key performance indicator corresponds to the at least one enterprise artifact protection protocol, generating, using a digital twin engine, sample implementations of the at least one enterprise artifact protection protocol. The method may comprise analyzing the sample implementations of the at least one enterprise artifact protection protocol. The method may comprise executing, based on the analysis, an enterprise artifact protection protocol.

In accordance with one or more embodiments, a computing platform may comprise at least one processor, a communication interface communicatively coupled to the at least one processor, and memory storing computer-readable instructions that, when executed by the at least one processor, cause the computing platform to receive, from a plurality of external devices, a stream of external data that includes real-world conditions. The computing platform may receive, from a plurality of internal devices, a stream of internal data that includes conditions associated with an enterprise organization. The computing platform may parse the external data and the internal data. The computing platform may identify, based on the parsing, a plurality of data types and a plurality of data values that correspond to the external data and the internal data. The computing platform may determine whether the external data is consistent with historic external data. The computing platform may, based on determining the external data is inconsistent with the historic external data, flag at least one key performance indicator. The computing platform may determine at least one critical value that corresponds to the at least one flagged key performance indicator. The computing platform may determine whether the at least one flagged key performance indicator corresponds to at least one enterprise artifact protection protocol. The computing platform may, based on determining that the at least one flagged key performance indicator corresponds to the at least one enterprise artifact protection protocol, generate, using a digital twin engine, sample implementations of the at least one enterprise artifact protection protocol. The computing platform may analyze the sample implementations of the at least one enterprise artifact protection protocol. The computing platform may execute, based on the analysis, an enterprise artifact protection protocol.

In accordance with one or more embodiments, one or more non-transitory computer-readable media storing instructions that, when executed by a computing platform comprising at least one processor, memory, and a communication interface, cause the computing platform to receive, from a plurality of external devices, a stream of external data that includes real-world conditions. The instructions, when executed, may cause the computing platform to receive, from a plurality of internal devices, a stream of internal data that includes conditions associated with an enterprise organization. The instructions, when executed, may cause the computing platform to parse the external data and the internal data. The instructions, when executed, may cause the computing platform to identify, based on the parsing, a plurality of data types and a plurality of data values that correspond to the external data and the internal data. The instructions, when executed, may cause the computing platform to determine whether the external data is consistent with historic external data. The instructions, when executed, may cause the computing platform to, based on determining the external data is inconsistent with the historic external data, flag at least one key performance indicator. The instructions, when executed, may cause the computing platform to determine at least one critical value that corresponds to the at least one flagged key performance indicator. The instructions, when executed, may cause the computing platform to determine whether the at least one flagged key performance indicator corresponds to at least one enterprise artifact protection protocol. The instructions, when executed, may cause the computing platform to, based on determining that the at least one flagged key performance indicator corresponds to the at least one enterprise artifact protection protocol, generate, using a digital twin engine, sample implementations of the at least one enterprise artifact protection protocol. The instructions, when executed, may cause the computing platform to analyze the sample implementations of the at least one enterprise artifact protection protocol. The instructions, when executed, may cause the computing platform to execute, based on the analysis, an enterprise artifact protection protocol.

These features, along with many others, are discussed in greater detail below.

BRIEF DESCRIPTION OF THE DRAWINGS

The present disclosure is illustrated by way of example and is not limited in the accompanying figures in which like reference numerals indicate similar elements and in which:

FIGS. 4A-4G depict an illustrative event sequence for preserving enterprise artifacts using digital twin technology and intelligent smart contracts, in accordance with one or more example embodiments.

DETAILED DESCRIPTION

Figure 1A:
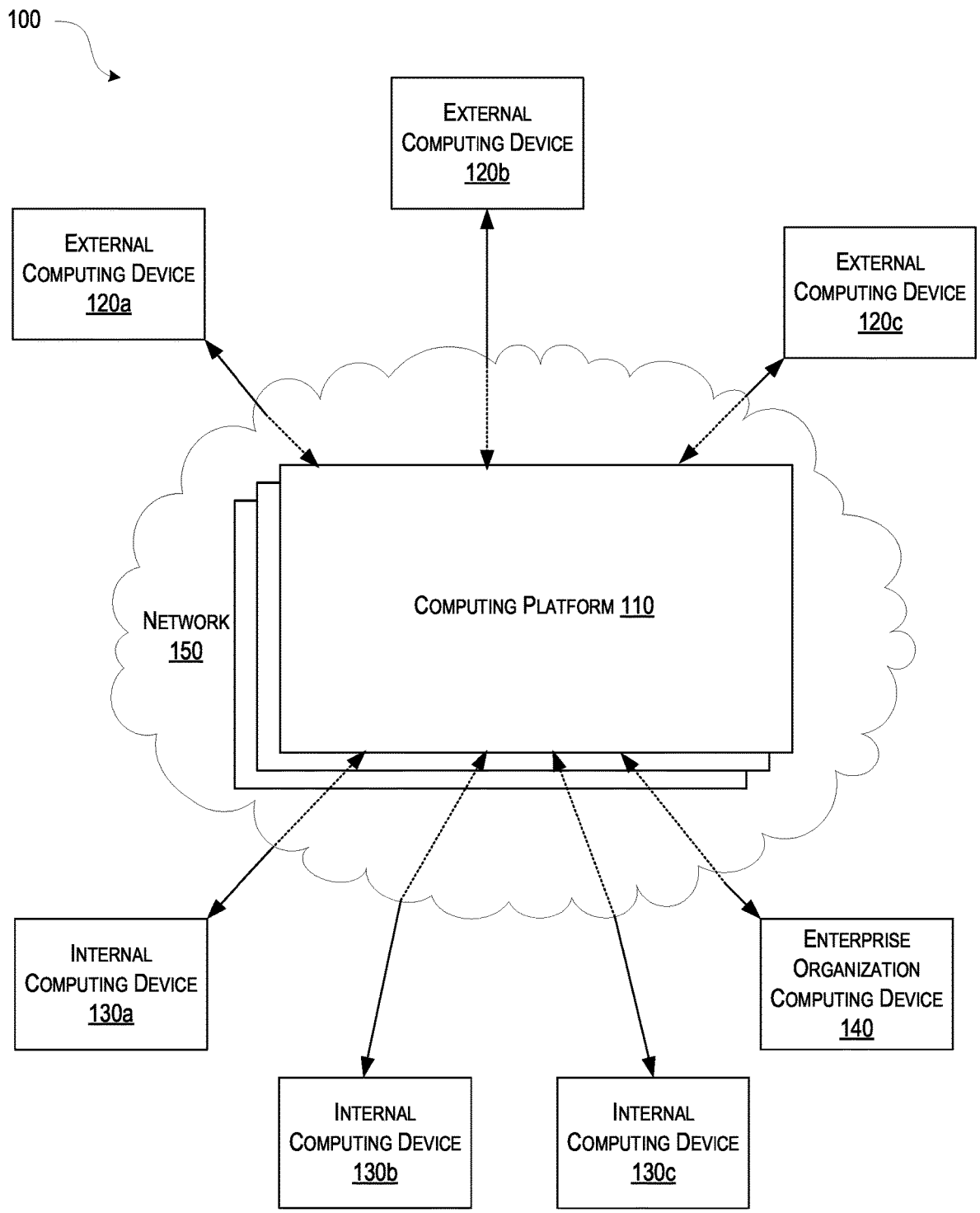
FIG. 1A depicts an illustrative example of a computer system for preserving enterprise artifacts using digital twin technology and intelligent smart contracts, in accordance with one or more example embodiments.

In the following description of various illustrative embodiments, reference is made to the accompanying drawings, which form a part hereof, and in which are shown, by way of illustration, various embodiments in which aspects of the disclosure may be practiced. It is to be understood that other embodiments may be utilized, and structural and functional modifications may be made, without departing from the scope of the present disclosure. Various aspects are capable of other embodiments and of being practiced or being carried out in various different ways.

It is noted that various connections between elements are discussed in the following description. It is noted that these connections are general and, unless specified otherwise, may be direct or indirect, wired or wireless, and that the specification is not intended to be limiting in this respect.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

As discussed above, current data retention and data protection protocols might not offer enterprise organizations a method of preserving enterprise artifacts for an extended period of time and/or a method of transmitting the enterprise artifacts from the compromised data center to a secure location. Accordingly, proposed herein is a solution to the problem described above that includes preserving, in real-time or near real-time, enterprise artifacts using digital twin technology and intelligent smart contracts. For example, a computing platform may continuously receive external data that describes real-world conditions and may continuously receive internal data that describes conditions associated with an enterprise organization and/or a data center. For each piece of data, the computing platform may identify the internal or external condition that the piece of data describes, and may categorize the piece of data based on the internal or external condition (e.g., "TORNADO_X," wherein X may indicate a geographic location and/or path of the tornado, or the like). The computing platform may determine whether the internal data is consistent with historic internal data and may determine whether the external data is consistent historic external data. In some instances, the computing platform may determine that the internal data (or the external data) is inconsistent with the historic internal data (or the historic external data), and may flag a key performance indicator (KPI) that identifies the inconsistency (e.g., a flagged "WIND" KPI may indicate the current wind speed is inconsistent with the historic wind speed, or the like). The computing platform may distribute the flagged KPI to a peer-to-peer (P2P) network storing at least a portion of a blockchain. The computing platform, using a smart contracts node on the blockchain, may determine a critical value associated with the flagged KPI, and may distribute the flagged KPI and the corresponding critical value to team nodes on the blockchain. The computing platform, using the team nodes on the blockchain, may analyze the flagged KPI and the corresponding critical value, and may determine whether to initiate at least one enterprise artifact protection protocol to preserve the enterprise artifacts that may be affected by the flagged KPI. The computing platform may, using a digital twin engine, analyze sample implementations of at least one enterprise artifact protection protocol, and may instruct a digital twin engine to execute at least one enterprise artifact protection protocol based on the analysis of the sample implementations.

In some examples, a computing environment may comprise the computing platform, a plurality of external devices, a plurality of internal devices, and/or an enterprise organization computing device. In some instances, the computing platform may comprise a data filtration and aggregation engine, a critical event prediction engine, a blockchain, and/or a digital twin engine. The plurality of external devices may continuously detect external data that may describe real-world conditions (e.g., weather reports, natural disaster warnings, civil unrest warnings, or the like) and the plurality of internal devices may continuously detect internal data that may describe conditions associated with an enterprise organization and/or a data center (e.g., CPU usage, load capacity, application load usage, power supply levels, or the like). The plurality of internal devices and the plurality of external devices may transmit the detected data to the data filtration and aggregation engine. The data filtration and aggregation engine may parse the received data to determine a data type associated with each piece of data and a data value associated with each piece of data (e.g., a weather report indicating a snowstorm may be associated with the data type "SNOWSTORM" and the data value "X inches of snow," or the like). The data filtration and aggregation engine may generate a data structure, and may store the received external data, the received internal data, a plurality of data types, and a plurality of data values in the data structure. The data filtration and aggregation engine may store the data structure in the aggregated data database.

The critical event prediction engine may retrieve the data structure from the aggregated data database. The critical event prediction engine may further retrieve historic external data and historic internal data from the aggregated data database. The critical event prediction engine may compare the internal data (or the external data) to the historic internal data (or the historic external data) to determine whether the internal data (or the external data) is consistent with the historic internal data (or the historic external data). If the critical event prediction engine determines that the internal data (or the external data) is consistent with the historic internal data (or the historic external data), then the critical event prediction engine may continue comparing the internal data (or the external data) to the historic internal data (or the historic external data). Alternatively, if the critical event prediction engine determines that the internal data (or the external data) is inconsistent with the historic internal data (or the historic external data), then the critical event prediction engine may flag a key performance indicator (KPI) to identify the inconsistency (e.g., if the current wind speed is inconsistent with the historic wind speed taken on the same day and at and/or around the same time of day, then the flagged KPI may be "WIND," or the like). In such instances, the critical event prediction engine may transmit the flagged KPI to the blockchain.

A smart contracts node on the blockchain may determine a critical value associated with the flagged KPI (e.g., using guidelines that may be generated by and received from the enterprise organization computing device). The smart contracts node may distribute the flagged KPI and the corresponding critical value to team nodes on the blockchain, wherein the team nodes on the blockchain may correspond to teams associated with the enterprise organization (e.g., a legal team, a security team, a load monitoring team, or the like). The team nodes on the blockchain may analyze the flagged KPI and the corresponding critical value (e.g., using guidelines that may be generated by and received from the enterprise organization computing device). Each team node on the blockchain may determine whether the flagged KPI may threaten the security of the enterprise artifacts (e.g., whether an ice storm may cause a data center housing the enterprise artifacts to lose power, whether the load capacity within the data center is approaching maximum capacity, or the like). At least one team node on the blockchain may determine that the flagged KPI might not threaten the security of the enterprise artifacts while at least one different team node on the blockchain may determine that the flagged KPI may threaten the security of the enterprise artifacts. In such instances (e.g., where there is no consensus among the team nodes), the smart contracts node may transmit the flagged KPI and the corresponding critical value to the enterprise organization computing device (e.g., for manual intervention). Alternatively, if there is consensus among the nodes that the flagged KPI may threaten the security of the enterprise artifacts, then the smart contracts nodes may transmit the flagged KPI to the digital twin engine. In some instances, there may be consensus among the nodes that the flagged KPI might not threaten the security of the enterprise artifacts and, as such, the smart contracts node might not transmit the flagged KPI to the digital twin engine.

The digital twin engine may retrieve, from the blockchain, at least one flagged KPI. The digital twin engine may parse the data stored on the blockchain to locate at least one enterprise artifact protection protocol that corresponds to the flagged KPI. The digital twin engine may generate a sample implementation of the at least one enterprise artifact protection protocol, and may transmit at least one sample implementation to the blockchain. The smart contracts node may analyze the at least one sample implementation and may elect at least one enterprise artifact protection protocol. The smart contracts node may transmit, to the digital twin engine, instructions to initiate the at least one elected enterprise artifact protection protocol. The digital twin engine may receive the instructions from the smart contracts node and may execute the at least one enterprise artifact protection protocol elected by the smart contracts node.

The disclosure provided herein is described, at least in part, in relation to a decentralized peer-to-peer (e.g., P2P) system specialized for the purpose of managing a blockchain. The decentralized P2P system may be comprised of computing devices that are distributed in multiple locations across a geographical area as opposed to a single location such as a business or company. The computing devices forming the decentralized P2P system may operate with each other to manage a blockchain, which may be a data structure used to store information related to the decentralized P2P system. More specifically, the blockchain may be a chronological linkage of data elements (e.g., blocks) which store data records relating to the decentralized computing system. The decentralized P2P system may be associated with an enterprise organization and may be used to determine whether to execute at least one enterprise artifact protection protocol.

An enterprise organization may access the decentralized P2P system through a specialized "wallet" (i.e., Identity Wallet) that may enable the enterprise organization to request and to perform functions related to the decentralized P2P network. Through the wallet, the enterprise organization may be able to engage at least one smart contracts program (e.g., via a smart contracts node and a plurality of team nodes on the blockchain) stored within the decentralized P2P system to analyze the external data and the internal data, and to determine whether to engage at least one enterprise artifact protection protocol. Furthermore, the enterprise organization may use the wallet to request performance of network-specific functions related to the decentralized P2P system such as determining a critical value associated with a flagged KPI (discussed below), analyzing at least one sample implementation of at least one enterprise artifact protection protocol, and executing at least one enterprise artifact protection protocol based on the analysis. The various computing devices forming the decentralized P2P computing system may operate as a team to perform network-specific functions requested by the enterprise organization. In performing the network-specific functions, the various computing devices may produce blocks that store the data generated during the performance of the network-specific functions and may add the blocks to the blockchain. After the block has been added to the blockchain, the wallet associated with the enterprise organization may indicate that the requested network-specific function has been performed.

For example, the enterprise organization's wallet may contain data that may be used to submit, to the decentralized P2P computing system, a request to determine whether to execute at least one enterprise artifact protection protocol. In particular, the data within the enterprise organization's wallet may comprise the external data, the historic external data, the internal data, and the historic internal data. The enterprise organization may use the data in the wallet to submit, to the smart contracts node within the decentralized P2P system, a request to determine whether to execute at least one enterprise artifact protection protocol. The enterprise organization may submit the request to the decentralized P2P system. The various computing devices forming the decentralized P2P computing system may extract the data from the wallet and may process the request. In doing so, a block may be created by the various computing devices of the decentralized P2P computing system. The block may store data indicating that the request was submitted to the decentralized P2P system. The various computing devices may add the block to the blockchain. The wallet associated with the enterprise organization may reflect the submission of the request.

In more detail, the decentralized P2P system may be specialized for the purpose of managing a distributed ledger, such as a private blockchain or a public blockchain, through the implementation of digital cryptographic hash functions, consensus algorithms, digital signature information, and network-specific protocols and commands. The decentralized P2P system (e.g., decentralized system) may be comprised of decentralized system infrastructure consisting of a plurality of computing devices, either of a heterogeneous or homogenous type, which serve as network nodes (e.g., full nodes and/or lightweight nodes) to create and sustain a decentralized P2P network (e.g., decentralized network). Each of the full network nodes may have a complete replica or copy of a blockchain stored in memory and may operate in concert, based on the digital cryptographic hash functions, consensus algorithms, digital signature information, and network-specific protocols, to execute network functions and/or maintain inter-nodal agreement as to the state of the blockchain. Each of the lightweight network nodes may have at least a partial replica or copy of the blockchain stored in memory and may request performance of network functions through the usage of digital signature information, hash functions, and network commands. In executing network functions of the decentralized network, at least a portion of the full nodes forming the decentralized network may execute the one or more cryptographic hash functions, consensus algorithms, and network-specific protocols to register a requested network function on the blockchain. In some instances, a plurality of network function requests may be broadcasted across at least a portion of the full nodes of the decentralized network, aggregated through execution of the one or more digital cryptographic hash functions, and validated by performance of the one or more consensus algorithms to generate a single work unit (e.g., block), which may be added in a time-based, chronological manner to the blockchain through performance of network-specific protocols.

While in practice the term "blockchain" may hold a variety of contextually derived meanings, the term blockchain, as used herein, refers to a concatenation of sequentially dependent data elements (e.g., blocks) acting as a data ledger that stores records relating to a decentralized computing system. Such data records may be related to those used by a particular entity or enterprise, such as a financial institution, and/or may be associated with a particular application and/or use case including, but not limited to, enterprise artifacts security, fund transfers, cryptocurrency, digital content storage and delivery, entity authentication and authorization, digital identity, marketplace creation and operation, internet of things (IoT), prediction platforms, currency exchange and remittance, P2P transfers, ride sharing, and precious metal and work of art registration and transference, among others. A "private blockchain" may refer to a blockchain of a decentralized private system in which only authorized computing devices are permitted to act as nodes in a decentralized private network and have access to the private blockchain. In some instances, the private blockchain may be viewable and/or accessible by authorized computing devices which are not participating as nodes within the decentralized private network, but still have proper credentials. A "public blockchain" may refer to a blockchain of a decentralized public system in which any computing devices may be permitted to act as nodes in a decentralized public network and have access to the public blockchain. In some instances, the public blockchain may be viewable and/or accessible by computing devices which are not participating as nodes within the decentralized public network.

Further, a "full node" or "full node computing device," as used herein, may describe a computing device in a decentralized system which operates to create and maintain a decentralized network, execute requested network functions, and maintain inter-nodal agreement as to the state of the blockchain. In order to perform such responsibilities, a computing device operating as a full node in the decentralized system may have a complete replica or copy of the blockchain stored in memory, as well as executable instructions for the execution of hash functions, consensus algorithms, digital signature information, network protocols, and network commands. A "lightweight node," "light node," "lightweight node computing device," or "light node computing device" may refer to a computing device in a decentralized system which may request the performance of network functions (e.g., requests to analyze at least one sample implementation of at least one enterprise artifact protection protocol, requests to elect at least one enterprise artifact protection protocol based on the analysis, or the like) within a decentralized network, but might not be capable of executing the requested network functions or maintaining inter-nodal agreement as to the state of the blockchain. As such, a computing device operating as a lightweight node in the decentralized system may have a partial replica or copy of the blockchain. In some instances, network functions, requested by lightweight nodes, to be performed by the decentralized network may also be requested by full nodes in the decentralized system.

"Network functions" and/or "network-specific functions," as described herein, may relate to functions which are able to be performed by nodes of a decentralized P2P network. In some arrangements, the data generated in performing network-specific functions may be stored on a blockchain associated with the decentralized P2P network.

Computer Architecture

FIG. 1A depicts an illustrative example of a computer system 100 that may be used for preserving, in real-time or near real-time, enterprise artifacts using digital twin technology and intelligent smart contracts, in accordance with one or more aspects described herein. Computer system 100 may comprise one or more computing devices including at least computing platform 110, external computing devices 120a-120c, internal computing devices 130a-130c, and enterprise organization computing device 140. While FIG. 1A depicts more than one external computing device (e.g., external computing devices 120a-120c), each of external computing devices 120a-120c may be configured in accordance with the features described herein. While the description herein may refer to external computing device 120, it is important to note that the functions described in connection with external computing device 120 may also be performed by any one of external computing devices 120a-120c. While FIG. 1A depicts external computing devices 120a-120c, more or less than three external computing devices may exist within computer system 100. Three external computing devices are depicted in FIG. 1A for illustration purposes only and are not meant to be limiting.

Further, while FIG. 1A depicts more than one internal computing device (e.g., internal computing devices 130a-130c), each of internal computing devices 130a-130c may be configured in accordance with the features described herein. While the description herein may refer to internal computing device 130, it is important to note that the functions described in connection with internal computing device 130 may also be performed by any one of internal computing devices 130a-130c. While FIG. 1A depicts internal computing devices 130a-130c, more or less than three internal computing devices may exist within computer system 100. Three internal computing devices are depicted in FIG. 1A for illustration purposes only and are not meant to be limiting.

While FIG. 1A depicts one enterprise organization computing device (e.g., enterprise organization computing device 140), more than one enterprise organization computing device may exist within computer system 100. One enterprise organization computing device is depicted in FIG. 1A for illustration purposes only and is not meant to be limiting.

Each one of external computing devices 120a-120c, internal computing devices 130a-130c, and enterprise organization computing device 140 may be configured to communicate with computing platform 110 through network 150. In some arrangements, computer system 100 may include additional computing devices and networks that are not depicted in FIG. 1A, which may also be configured to interact with computing platform 110.

Computing platform 110 may be associated with a distinct entity such as an enterprise organization, company, school, government, and the like, and may comprise one or more personal computer(s), server computer(s), hand-held or laptop device(s), multiprocessor system(s), microprocessor-based system(s), set top box(es), programmable user electronic device(s), network personal computer(s) (PC), minicomputer(s), mainframe computer(s), distributed computing environment(s), and the like. Computing platform 110 may include computing hardware and software that may host various data and applications for performing tasks of the centralized entity and interacting with external computing device 120, internal computing device 130, enterprise organization computing device 140, and/or additional computing devices. As discussed in greater detail below in connection with FIG. 1B, computing platform 110 may use data filtration and aggregation engine 111, aggregated data database 112, critical event prediction engine 113, blockchain 114, digital twin engine 115, database 116, and/or processor(s) 117 to analyze and execute at least one enterprise artifact protection protocol. Each computing device within computing platform 110 may contain database 116 and processor(s) 117, which may be stored in memory of the one or more computing devices of computing platform 110. Through execution of computer-readable instructions stored in memory, the computing devices of computing platform 110 may be configured to perform functions of the centralized entity and store the data generated during the performance of such functions in database 116.

In some arrangements, computing platform 110 may include and/or be part of enterprise information technology infrastructure and may host a plurality of enterprise applications, enterprise databases, and/or other enterprise resources. Such applications may be executed on one or more computing devices included in computing platform 110 using distributed computing technology and/or the like. In some instances, computing platform 110 may include a relatively large number of servers that may support operations of the enterprise organization, such as a financial institution. Computing platform 110, in this embodiment, may generate a single centralized ledger, which may be stored in database 116, for data received from at least one of external computing device 120, internal computing device 130, and/or enterprise organization computing device 140.

External computing device 120, internal computing device 130, and/or enterprise organization computing device 140 may be configured to interact with computing platform 110 through network 150. In some instances, at least one of external computing device 120, internal computing device 130, and/or enterprise organization computing device 140 may be configured to receive and transmit information corresponding to requests through particular channels and/or applications associated with computing platform 110. The requests submitted by at least one of external computing device 120, internal computing device 130, and/or enterprise organization computing device 140 may initiate the performance of particular computational functions at computing platform 110, such as the analysis of at least one sample implementation of at least one enterprise artifact protection protocol.

As stated above, computer system 100 also may include one or more networks, which may interconnect one or more of computing platform 110, external computing device 120, internal computing device 130, and enterprise organization computing device 140. For example, centralized computer system 100 may include network 150. Network 150 may include one or more sub-networks (e.g., local area networks (LANs), wide area networks (WANs), or the like). Furthermore, computer system 100 may include a local network configured to interconnect each of the computing devices comprising computing platform 110.

External computing device 120 may continuously monitor real-world conditions (e.g., conditions that describe the environment surrounding an enterprise organization, conditions that describe the environment surrounding a data center, or the like). The real-world conditions may correspond to a geographic location within which the enterprise organization may be located. In some instances, the real-world conditions might not correspond to the geographic location of the enterprise organization, but may correspond to a geographic location within which enterprise artifacts may be stored (e.g., a geographic location of a data center). External computing device 120 may be configured to receive a stream of external data (e.g., local weather reports, natural disaster tracking, international news reports on resource shortages, domestic news reports on events occurring in a location, or the like) that corresponds to at least one of the geographic location of the enterprise organization or the geographic location of the data center. In some instances, each one of external computing devices 120a-120c may be configured to receive a different stream of external data. External computing device 120 may detect the stream of external data (e.g., a weather report indicating a change in wind speed, or the like) and may transmit the external data to data filtration and aggregation engine 111.

Internal computing device 130 may continuously monitor conditions within the enterprise organization. In some instances, internal computing device 130 may be configured to continuously monitor conditions associated with the data center within which the enterprise organization may store the enterprise artifacts (e.g., enterprise organization applications, enterprise organization data, enterprise organization operations, or the like). To do so, internal computing device 130 may be configured to receive a stream of internal data (e.g., current CPU capacity, maximum CPU capacity, current load usage, maximum load capacity, system power levels, or the like). In some instances, each one of internal computing devices 130a-130c may be configured to receive a different stream of internal data. Internal computing device 130 may detect the stream of internal data (e.g., a warning that the current load usage is approaching the maximum load capacity, or the like) and may transmit the internal data to data filtration and aggregation engine 111.

Enterprise organization computing device 140 may be configured to generate a plurality of analysis guidelines and to transmit the plurality of analysis guidelines to blockchain 114. As discussed in connection with FIG. 1B, a plurality of nodes on blockchain 114 (e.g., a plurality of team nodes, wherein each team node may correspond to a different team and/or department within the enterprise organization, or the like) may use the plurality of analysis guidelines to determine whether a flagged KPI may threaten the security of the enterprise artifacts. In some instances, the plurality of analysis guidelines may instruct each team node to review enterprise organization rules specific to the particular team and/or department within the enterprise organization. The plurality of analysis guidelines may instruct each team node to compare the flagged KPI to the enterprise organization rules specific to the particular team and/or department to determine whether the flagged KPI violates at least one enterprise organization rule. If the team node determines that the flagged KPI violates at least one enterprise organization rule, then the plurality of analysis guidelines may instruct the team node to identify the flagged KPI as a potential threat to the security of the enterprise artifacts. The plurality of analysis guidelines may further instruct the team node to identify the at least one enterprise organization rule that the flagged KPI may violate. Alternatively, if the team node determines that the flagged KPI might not violate the enterprise organization rules, then the plurality of analysis guidelines may instruct the team node to identify the flagged KPI as non-threatening to the security of the enterprise artifacts. In some instances, the team node might not be able to determine whether the flagged KPI violates at least one enterprise organization rule (e.g., due to ambiguities within the at least one enterprise organization rule, or the like). In such instances, the plurality of analysis guidelines may instruct the team node to identify the flagged KPI as potentially threatening to the security of the enterprise artifacts and to recommend that the flagged KPI undergo manual analysis (e.g., by an agent on the team and/or department that corresponds to the team node).

Enterprise organization computing device 140 may further be configured to generate a plurality of enterprise artifact protection protocols. An enterprise artifact protection protocol may comprise a series of instructions which, when executed, may protect the enterprise artifacts from scenarios that may potentially threaten (e.g., impact, weaken, or the like) the security of the enterprise artifacts. As such, when executed, the enterprise artifact protection protocols may increase and/or preserve the security of the enterprise artifacts. To generate the plurality of enterprise artifact protection protocols, enterprise organization computing device 140 may predict a plurality of events that may threaten the security of the enterprise artifacts (e.g., a power outage at the data center due to an ice storm, CPU usage within the enterprise organization approaching maximum CPU capacity, or the like). To predict the plurality of events that may threaten the security of the enterprise artifacts, enterprise organization computing device 140 may analyze the historic external data and the historic internal data (e.g., external data and internal data that was previously received and processed using the features described herein, or the like). Enterprise organization computing device 140 may determine countermeasures that, when executed, may protect the enterprise artifacts and may use the countermeasures to generate the plurality of enterprise artifact protection protocols. Enterprise organization computing device 140 may draft code, using at least one programming language, that, when executed, may initiate the corresponding enterprise artifact protection protocol. In some instances, enterprise organization computing device 140 may draft code, using at least one programming language, that corresponds to a sample implementation of at least one enterprise artifact protection protocol (e.g., a sample implementation of a feature of at least one enterprise artifact protection protocol, or the like) and that, when executed, may initiate the corresponding sample implementation of the enterprise artifact protection protocol.

In some instances, enterprise organization computing device 140 may analyze the enterprise organization rules specific to each team and/or department within the enterprise organization to generate the plurality of enterprise artifact protection protocols. For each team and/or department within the enterprise organization, enterprise organization computing device 140 may parse the enterprise organization rules to identify, for each rule, at least one scenario that may violate the rule. For each identified scenario, enterprise organization computing device 140 may determine countermeasures that, when executed, may neutralize any attempts to harm the enterprise artifacts and/or may protect the enterprise artifacts from potential threats. Enterprise organization computing device 140 may use the countermeasures to generate the plurality of enterprise artifact protection protocols. Enterprise organization computing device 140 may transmit the plurality of enterprise artifact protection protocols to blockchain 114.

In some instances, enterprise organization computing device 140 may receive, from the smart contracts node on blockchain 114, at least one flagged KPI that was identified by at least one team node as a potential threat to the security of the enterprise artifacts. Enterprise organization computing device 140 may transmit the at least one flagged KPI to the team and/or department that corresponds to the team node that identified the flagged KPI as a potential threat. Enterprise organization computing device 140 may instruct the team and/or department to manually analyze the flagged KPI and to determine whether to execute at least one enterprise artifact protection protocol based on the analysis of the flagged KPI.

In some instances, enterprise organization computing device 140 may receive, from digital twin engine 115, at least one flagged KPI and a notification indicating that blockchain 114 might not contain an enterprise artifact protection protocol that addresses the at least one flagged KPI. Enterprise organization computing device 140 may analyze the at least one flagged KPI and may determine countermeasures that, when executed, may protect the enterprise artifacts. In some instances, enterprise organization computing device 140 may identify at least one team and/or department within the enterprise organization whose rules may be designed to protect the enterprise artifacts from the at least one flagged KPI. Enterprise organization computing device 140 may compare the at least one flagged KPI to the enterprise organization rules that correspond to the at least one team and/or department. Enterprise organization computing device 140 may identify at least one way in which the flagged KPI may violate at least one enterprise organization rule that corresponds to the at least one team and/or department, and may use the at least one violation to determine countermeasures that, when executed, may protect the enterprise artifacts from the at least one violation. Enterprise organization computing device 140 may use the countermeasures to generate at least one enterprise artifact protection protocol that addresses the at least one flagged KPI. Enterprise organization computing device 140 may transmit the at least one enterprise artifact protection protocol to blockchain 114.

Figure 1B:
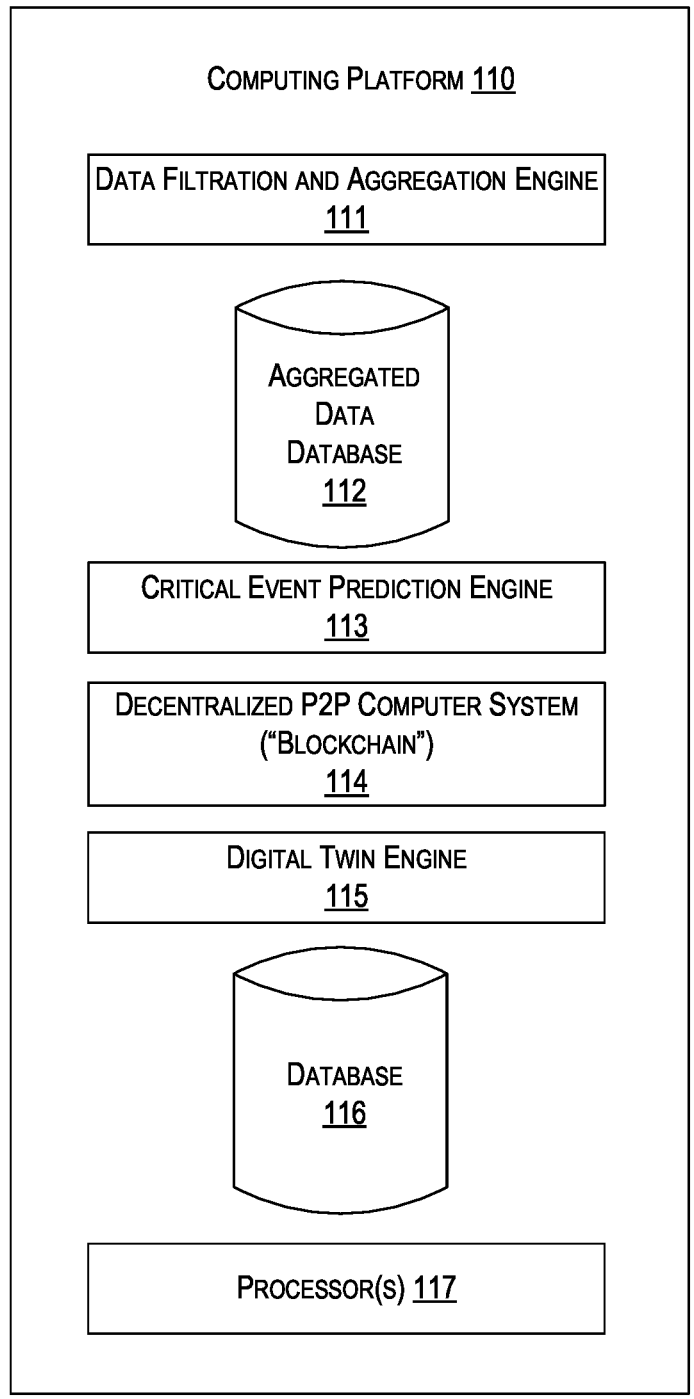
FIG. 1B depicts an illustrative example of the computing platform that may be used for preserving enterprise artifacts using digital twin technology and intelligent smart contracts, in accordance with one or more example embodiments.

FIG. 1B depicts the components of computing platform 110 that may be used for preserving, in real-time or near real-time, enterprise artifacts using digital twin technology and intelligent smart contracts, in accordance with one or more aspects described herein. As discussed in connection with FIG. 1A, computing platform 110 may comprise data filtration and aggregation engine 111, aggregated data database 112, critical event prediction engine 113, blockchain 114, digital twin engine 115, database 116, and/or processor(s) 117.

Data filtration and aggregation engine 111 may receive a plurality of data streams from external computing devices 120a-120c and internal computing devices 130a-130c. In particular, data filtration and aggregation engine 111 may be configured to receive at least one stream of external data from external computing devices 120a-120c and at least one stream of internal data from internal computing devices 130a-130c. Each stream of external data may correspond to a different one of external computing devices 120a-120c. As such, each stream of external data may correspond to a different category of external data (e.g., a local weather report, a news report on events occurring in a particular location, or the like). Similarly, each stream of internal data may correspond to a different one of internal computing devices 130a-130c. As such, each stream of internal data may correspond to a different category of internal data (e.g., maximum CPU capacity, maximum load capacity, current power supply levels, or the like).

Data filtration and aggregation engine 111 may filter the received data into separate groups based on whether the data corresponds to a stream of external data or a stream of internal data. Data filtration and aggregation engine 111 may aggregate the streams of external data into an external data group and may aggregated the streams of internal data into an internal data group. Within the external data group, data filtration and aggregation engine 111 may parse each piece of external data to identify at least one data type and at least one data value that corresponds to the piece of external data. The identified data type may describe the corresponding data stream (e.g., identify whether the piece of external data corresponds to weather ("ICE_STORM_X", wherein X may indicate the geographic location of the ice storm), breaking news ("CIVIL_UNREST_X", wherein X may indicate the geographic location of the civil unrest), a natural disaster ("TORNADO_X", wherein X may indicate the geographic location and/or path of the tornado), or the like). The identified data value may describe the data type and/or data stream (e.g., "SNOW_Y_INCHES" may describe "ICE_STORM_X," "WINDS_80MPH" may describe "TORNADO_X," or the like).

Similarly, within the internal data group, data filtration and aggregation engine 111 may parse each piece of internal data to identify at least one data type and at least one data value that corresponds to the piece of internal data. As described above, the identified data type may describe the corresponding data stream (e.g., identify whether the piece of internal data corresponds to current CPU usage ("SERVER1_CPU"), current power supply levels ("DATA_CENTER1_POWER"), or the like). The identified data value may describe the data type and/or data stream (e.g., "ZZ %" may describe "SERVER1_CPU," "AA %" may describe "DATA_CENTER1_POWER," or the like).

Data filtration and aggregation engine 111 may generate a data structure and may store, within the data structure, each piece of external data and internal data. In particular, data filtration and aggregation engine 111 may store each piece of external data and internal data within the data structure based on the identified data types (e.g., based on the stream to which each piece of data corresponds) and the identified data values. In some instances, the data structure may indicate the plurality of data types and, as such, data filtration and aggregation engine 111 may use the plurality of data types to populate the data structure (e.g., to store the external data and the internal data in the data structure based on the data stream to which the data corresponds). In some instances, data filtration and aggregation engine 111 may determine that at least one piece of external data or internal data might not correspond to the plurality of data types identified in the data structure. As such, data filtration and aggregation engine 111 may identify at least one additional data type that corresponds to the at least one piece of external data or internal data, and may store the at least one piece of external data or internal data in the data structure based on the at least one additional data type. Data filtration and aggregation engine 111 may store the data structure in aggregated data database 112.

In some instances, data filtration and aggregation engine 111 may generate a portion of the data structure using the external data and the internal data. As such, data filtration and aggregation engine 111 may, upon filtering and aggregating new streams of data, add the newly filtered and aggregated data to the existing data structure by generating an additional portion of the existing data structure and by adding the additional portion to the existing data structure. In such instances, data filtration and aggregation engine 111 may transmit each additional portion of the data structure to aggregated data database 112, and may instruct aggregated data database 112 to store each additional portion of the data structure.

Aggregated data database 112 may receive, from data filtration and aggregation engine 111, the data structure or the portion of the data structure and may store the received data structure and/or the portion of the data structure. As described above, data filtration and aggregation engine 111 may continuously generate additional portions of the existing data structure when new streams of external data and new streams of internal data are received. Upon receipt of an additional portion of the existing data structure, aggregated data database 112 may flag the previously received portions of the data structure as historic data (e.g., historic external data, historic internal data, or the like). Aggregated data database 112 may store the historic external data and the historic internal data within aggregated data database 112. The historic external data may comprise external data that was previously analyzed and processed using the features and methods described herein. Similarly, the historic internal data may comprise internal data that was previously analyzed and processed using the features and methods described herein.

In some instances, data filtration and aggregation engine 111 may generate a new data structure when new streams of external data and new streams of internal data are received. Upon receipt of the new data structure, from data filtration and aggregation engine 111, aggregated data database 112 may flag the previously received data structures as historic data (e.g., historic external data, historic internal data, or the like). Aggregated data database 112 may store the historic external data and the historic internal data within aggregated data database 112.

Access to aggregated data database 112 may differ depending on the computing device that is requesting access (e.g., a hierarchy of accessibility). Data filtration and aggregation engine 111 may be associated with a first level of accessibility (e.g., a least restrictive level of accessibility). Data filtration and aggregation engine 111 may perform functions on the data stored within aggregated data database 112 (e.g., access the data structure(s), add data structure(s), remove data structure(s), modify data structure(s), or the like). Critical event prediction engine 113 may be associated with a second level of accessibility (e.g., a more restrictive level of accessibility than the first level of accessibility). Critical event prediction engine 113 may access the data structure(s), but might not be permitted to add, remove, or modify the data structure(s) within aggregated data database 112.

Critical event prediction engine 113 may retrieve, from aggregated data database 112, the data structure and/or portions of the data structure, the historic external data, and the historic internal data. Critical event prediction engine 113 may identify the current external data, the current internal data, the historic external data, and the historic internal data. In some instances, critical event prediction engine 113 may parse the retrieved data to identify the data structure and/or the portion of the data structure that aggregated data database 112 may have flagged as historic data.

Critical event prediction engine 113 may analyze the data retrieved from aggregated data database 112. To do so, critical event prediction engine 113 may compare the external data (or the internal data) to the historic external data (or the historic internal data). Critical event prediction engine 113 may, using the data structure(s) and/or the portion of the data structure, compare the plurality of data types associated with the historic external data (or the historic internal data) to the plurality of data types associated with the external data (or the internal data). Critical event prediction engine 113 may determine that at least one data type associated with the external data (or the internal data) might not correspond to (e.g., match, be similar to, or the like) at least one data type associated with the historic external data (or the historic internal data) and, as such, critical event prediction engine 113 may determine that the external data (or the internal data) might not have been previously received. Critical event prediction engine 113 may terminate analysis on the external data (or the internal data) that might not have been previously received and may analyze the remaining external data (or the remaining internal data), if any.

In some instances, critical event prediction engine 113 may determine that at least one data type associated with the external data (or the internal data) may correspond to (e.g., match, be similar to, or the like) at least one data type associated with the historic external data (or the historic internal data). Critical event prediction engine 113 may compare the data value that corresponds to the data type associated with the external data (or the internal data) to the data value that corresponds to the data type associated with the historic external data (or the historic internal data). Critical event prediction engine 113 may determine whether the data value that corresponds to the data type associated with the external data (or the internal data) is consistent with (e.g., matches, is within a predetermined range, or the like) the data value that corresponds to the data type associated with the historic external data (or the historic internal data). In some instances, critical event prediction engine 113 may determine that the data values are consistent (e.g., match, are within the predetermined range, or the like). As such, critical event prediction engine 113 might not flag the data value that corresponds to the data type associated with the external data (or the internal data). Critical event prediction engine 113 may analyze the remaining external data (or the remaining internal data), if any.

Alternatively, in some instances, critical event prediction engine 113 may determine that the data value that corresponds to the data type associated with the external data (or the internal data) might not be consistent (e.g., might not match, might not be within the predetermined range, or the like) with the data value that corresponds to the data type associated with the historic external data (or the historic internal data). In such instances, critical event prediction engine 113 may identify the inconsistency between the data values using a key performance indicator (KPI). The KPI may specify a feature (e.g., measurement, parameter, or the like) of the data type that corresponds to the external data (or the internal data) that may be different from the same feature of the data type that corresponds to the historic external data (or the historic internal data). Critical event prediction engine 113 may flag the KPI and may transmit, to blockchain 114, the flagged KPI, the data type and data value that correspond to the external data (or the internal data), and the data type and data value that correspond to the historic external data (or the historic internal data).

As described in detail in connection with FIG. 2 to FIG. 3B, blockchain 114 may comprise a plurality of nodes, wherein the plurality of nodes may comprise a smart contracts node and at least one team node. The smart contracts node may be configured to execute (e.g., automatically, or the like) at least one action, of a plurality of actions, based on determining at least one predetermined condition may be satisfied. Alternatively, the smart contracts node may be configured to resist execution of the at least one action, of the plurality of actions, based on determining the at least one predetermined condition might not be satisfied.

The smart contracts node may receive, from critical event prediction engine 113, the flagged KPI, the data type and data value that correspond to the external data (or the internal data), and the data type and data value that correspond to the historic external data (or the historic internal data). The smart contracts node may use the received data to determine a critical value that corresponds to the flagged KPI. The critical value that corresponds to the flagged KPI may indicate a predicted degree of whether and/or how much the flagged KPI may threaten (e.g., harm, weaken, or the like) the security of the enterprise artifacts. The critical value may be within a predetermined range (e.g., a scale from 0.0 to 10.0). A critical value may be associated with a first level critical value if the critical value is closer to 0.0. A critical value that may be associated with the first level critical value may indicate that the corresponding flagged KPI might not pose a threat to the security of the enterprise artifacts. Alternatively, a critical value may be associated with a second level critical value if the critical value is closer 10.0. A critical value that may be associated with the second level critical value may indicate that the corresponding flagged KPI may pose a threat to the security of the enterprise artifacts.

In some instances, a critical value that may be associated with the first level critical value may indicate that the corresponding external data (or the corresponding internal data) may be consistent with the historic external data (or the historic internal data). Alternatively, in some instances, a critical value that may be associated with the second level critical value may indicate that the corresponding external data (or the corresponding internal data) might not be consistent with the historic external data (or the historic internal data).

To determine the critical value that corresponds to the flagged KPI, the smart contracts node may consider a plurality of conditions that may predict the degree of impact that the flagged KPI may inflict upon the enterprise organization and/or the data center and, by extension, the security of the enterprise artifacts. In some instances, the smart contracts node may consider the urgency of the flagged KPI (e.g., a predicted amount of time remaining before a natural disaster causes either the enterprise organization or the data center to experience power failure, or the like), the current state of the flagged KPI (e.g., whether either the enterprise organization and/or the data center commenced power failure recovery procedures, or the like), the predicted wind down period of the flagged KPI (e.g., a predicted amount of time until the completion of an enterprise operation that may be overloading the current CPU capacity, or the like), and/or the likelihood of the flagged KPI passing (e.g., a likelihood of a tornado's path turning away from the enterprise organization and/or the data center, or the like).

The smart node contracts may store the critical value associated with the flagged KPI within a data block on blockchain 114. The smart contracts node may distribute the flagged KPI and the critical value associated with the flagged KPI to the plurality of team nodes on blockchain 114. The smart contracts node may receive, from each team node of the plurality of team nodes, an indication, from the point of view of the team node, of whether the flagged KPI threatens the security of the enterprise artifacts. A team node, of the plurality of team nodes, may indicate that the flagged KPI may threaten the security of the enterprise artifacts. Additionally or alternatively, a team node, of the plurality of team nodes, may indicate that the flagged KPI might not threaten the security of the enterprise artifacts.

The smart contracts node may receive, from at least one team node of the plurality of team nodes, an indication that the flagged KPI might not threaten the security of the enterprise artifacts and may receive, from at least one different team node of the plurality of team nodes, an indication that the flagged KPI may threaten the security of the enterprise artifacts (e.g., there might not be consensus among the team nodes, or the like). In such instances, the smart contracts node may transmit the flagged KPI and the critical value associated with the flagged KPI to enterprise organization computing device 140. The smart contracts node may also transmit, to enterprise organization computing device 140, instructions to manually analyze the flagged KPI and the critical value associated with the flagged KPI.

In some instances, the smarts contracts node may receive, from each team node of the plurality of team nodes, an indication that the flagged KPI might not threaten the security of the enterprise artifacts (e.g., there may be consensus among the nodes that the flagged KPI might not threaten the security of the enterprise artifacts, or the like). The smart contracts node may determine, based on the indications from the plurality of team nodes, that execution of an enterprise artifact protection protocol might not be necessary based on the consensus among the plurality of team nodes. As such, the smart contracts node may analyze additional flagged KPIs, if any.

Additionally or alternatively, the smart contracts node may receive, from each team node of the plurality of team nodes, an indication that the flagged KPI may threaten the security of the enterprise artifacts (e.g., there may be consensus among the team nodes that the flagged KPI may threaten the security of the enterprise artifacts). The smart contracts node may transmit the flagged KPI to digital twin engine 115. The smart contracts node may receive, from digital twin engine 115, at least one sample implementation of at least one enterprise artifact protection protocol. The smart contracts node may analyze each sample implementation and may elect an enterprise artifact protection protocol, which may be used to safeguard the enterprise artifacts from the flagged KPI. The smart contracts node may transmit, to digital twin engine 115, a notification indicating the at least one elected enterprise artifact protection protocol. The smart contracts node may further transmit, to digital twin engine 115, instructions to execute the at least one elected enterprise artifact protection protocol.

The plurality of team nodes on blockchain 114 may receive, from the smart contracts node, the flagged KPI and the critical value associated with the flagged KPI. As discussed in connection with FIG. 1B, each node of the plurality of team nodes may correspond to a different team and/or department within the enterprise organization (e.g., a legal team, a security team, a load management team, or the like). Each team node of the plurality of team nodes may use the plurality of analysis guidelines, received by blockchain 114 and from enterprise organization computing device 140, to determine whether the flagged KPI may threaten the security of the enterprise artifacts. To do so, in some instances, the plurality of analysis guidelines may instruct each team node to review the enterprise organization rules specific to the particular team and/or department within the enterprise organization. The plurality of analysis guidelines may instruct each team node to compare the flagged KPI to the enterprise organization rules specific to the particular team and/or department to determine whether the flagged KPI violates at least one enterprise organization rule.

If the team node determines that the flagged KPI violates at least one enterprise organization rule, then the plurality of analysis guidelines may instruct the team node to identify the flagged KPI as a potential threat to the security of the enterprise artifacts. The plurality of analysis guidelines may further instruct the team node to identify the at least one enterprise organization rule that the flagged KPI may violate. Alternatively, if the team node determines that the flagged KPI might not violate the enterprise organization rules, then the plurality of analysis guidelines may instruct the team node to identify the flagged KPI as non-threatening to the security of the enterprise artifacts. In some instances, the team node might not be able to determine whether the flagged KPI violates at least one enterprise organization rule (e.g., due to ambiguous language within the enterprise organization rule, due to a cross reference to an enterprise organization rule associated with a different team and/or department, or the like). In such instances, the plurality of analysis guidelines may instruct the team node to identify the flagged KPI as potentially threatening to the security of the enterprise artifacts and to recommend that the flagged KPI undergo manual analysis (e.g., by an agent on the team and/or department that corresponds to the team node, or the like). Each team node of the plurality of team nodes may transmit the determination (e.g., that the flagged KPI violates at least one enterprise organization rule, that the flagged KPI might not violate the enterprise organization rules, that it may be unclear whether the flagged KPI violates at least one enterprise organization rule, or the like) to the smart contracts node.

If the smart contracts node determines that there is consensus among the plurality of team nodes (e.g., each team node of the plurality of team nodes indicates that the flagged KPI may threaten the security of the enterprise artifacts, or the like), then the smart contracts node may transmit the flagged KPI to digital twin engine 115. Digital twin engine 115 may receive, from the smart contracts node, the flagged KPI. Digital twin engine 115 may determine whether at least one enterprise artifact protection protocol that corresponds to the flagged KPI is stored on blockchain 114. Digital twin engine 115 may determine that blockchain 114 might not contain at least one enterprise artifact protection protocol that corresponds to the flagged KPI. Digital twin engine 115 may transmit the flagged KPI to enterprise organization computing device 140 along with a notification indicating that blockchain 114 might not contain an enterprise artifact protection protocol that addresses the flagged KPI. Digital twin engine 115 may further transmit, to enterprise organization computing device 140, a request for the flagged KPI to be manually analyzed by a team and/or department within the enterprise organization.

Alternatively, digital twin engine 115 may determine that at least one enterprise artifact protection protocol that corresponds to the flagged KPI is stored on blockchain 114. Digital twin engine 115 may parse the flagged KPI and may retrieve, from blockchain 114 and based on the parsing, the at least one enterprise artifact protection protocol that corresponds to the flagged KPI. As described above, the at least one enterprise artifact protection protocol may comprise a series of instructions which, when executed, may protect the enterprise artifacts from scenarios that may potentially threaten (e.g., impact, weaken, or the like) the security of the enterprise artifacts. As such, when executed, the enterprise artifact protection protocol may increase and/or preserve the security of the enterprise artifacts. Digital twin engine 115 may identify at least one enterprise artifact protection protocol that corresponds to the flagged KPI (e.g., addresses at least one scenario where the flagged KPI harms the security of the enterprise artifacts, or the like). Digital twin engine 115 may generate a sample implementation of the at least one identified enterprise artifact protection protocol.

To generate the at least one sample implementation, digital twin engine 115 may locate and retrieve, from blockchain 114, code that corresponds to the sample implementation of the at least one enterprise artifact protection protocol. Digital twin engine 115 may execute the code that corresponds to the sample implementation of the at least one enterprise artifact protection protocol. In doing so, digital twin engine 115 may illustrate how the enterprise artifacts may be protected from the flagged KPI (e.g., illustrate how changing the storage location of the enterprise artifacts may increase the level of security surrounding the enterprise artifacts, illustrate how transmitting an enterprise organization operation from a first location to a second location may preserve the power supply associated with the first location, or the like).

Digital twin engine 115 may transmit the sample implementation to blockchain 114. In some instances, digital twin engine 115 may transmit the sample implementation to the smart contracts node of blockchain 114.

Digital twin engine 115 may receive, from blockchain 114 (e.g., from the smart contracts node of blockchain 114, or the like) an indication of at least one enterprise artifact protection protocol to be executed. Digital twin engine 115 may locate and retrieve, from blockchain 114, code that corresponds to the at least one enterprise artifact protection protocol elected by blockchain 114. Digital twin engine 115 may execute the code that corresponds to the at least one enterprise artifact protection protocol elected by blockchain 114.

In some instances, digital twin engine 115 may be configured to transmit the enterprise artifacts from a first location (e.g., from within the enterprise organization and/or the data center, or the like) to a second location (e.g., a location that may be different from the location of the enterprise organization and/or the data center, or the like). To do so, the code executed by digital twin engine 115 may configure digital twin engine 115 to identify (e.g., from a list of predetermined, secure locations, or the like) the second location and to transmit, using a plurality of data packets, the enterprise artifacts. In some instances, each data packet of the plurality of data packets may comprise a component of the enterprise artifacts (e.g., a portion of enterprise organization data, a portion of an enterprise organization application, a portion of an enterprise organization operation, or the like). Digital twin engine 115 may transmit the plurality of data packets to the second location (e.g., a second, secure data center, or the like) and may instruct at least one computing device at the second location to organize the received data packets such that the received data packets reflect the enterprise artifacts as they existed within the first location.

In some instances, digital twin engine 115 may be configured to duplicate the enterprise artifacts and to transmit the duplications to the second location. To do so, the code executed by digital twin engine 115 may configure digital twin engine 115 to duplicate each data packet such that, when combined, the totality of (or a predetermined subset of) the duplicated data packets may comprise the totality of (or a predetermined subset of) the enterprise artifacts. Digital twin engine 115 may further be configured to replicate each data packet and to transmit each replicated data packet to the second location. Digital twin engine 115 may transmit, to at least one computing device at the second location, instructions to organize the received replications of the data packets such that the replications of the data packets reflect the enterprise artifacts (or the predetermined subset of the enterprise artifacts) as they existed within the first location.

Figure 2:
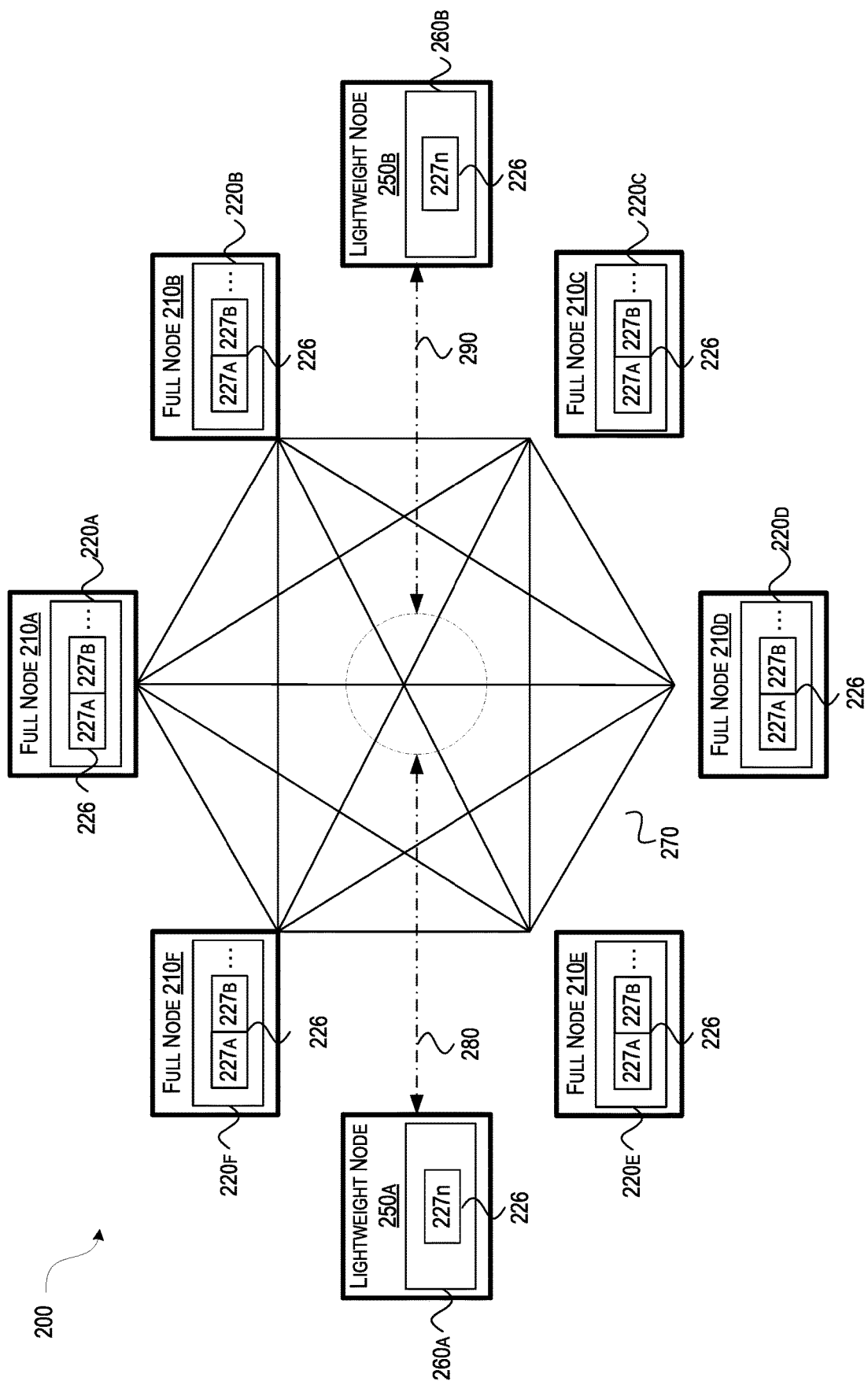
FIG. 2 depicts an illustrative example of a decentralized peer-to-peer (P2P) computer system that may be used for preserving enterprise artifacts using digital twin technology and intelligent smart contracts, in accordance with one or more example embodiments.

FIG. 2 depicts an illustrative example of decentralized P2P computer system 120 that may be used for preserving, in real-time or near real-time, enterprise artifacts using digital twin technology and intelligent smart contracts, in accordance with one or more aspects described herein. Decentralized P2P computer system 200 may include a plurality of full node computing devices 210A, 210B, 210C, 210D, 210E, and 210F and lightweight node computing devices 250A and 250B, which may be respectively similar to full node computing device 210 described in FIG. 3A and lightweight node computing device 250 described in FIG. 3B. While a particular number of full node computing devices and lightweight node computing devices are depicted in FIG. 2, it should be understood that a number of full node computing devices and/or lightweight node computing devices greater or less than that of the depicted full node computing devices and lightweight node computing devices may be included in decentralized P2P computer system 200. Accordingly, any additional full node computing devices and/or lightweight node computing devices may respectively perform in the manner described below in regard to full node computing devices 210A-210F and lightweight node computing devices 250A and 250B in decentralized P2P computer system 200.

Each of full node computing devices 210A-210F may operate in concert to create and maintain decentralized P2P network 270 of decentralized P2P computer system 200. In creating decentralized P2P network 270 of decentralized P2P computer system 200, processors, ASIC devices, and/or graphics processing units (e.g., GPUs) of each full node computing device 210A-210F may execute network protocols which may cause each full node computing device 210A-210F to form a communicative arrangement with the other full node computing devices 210A-210F in decentralized P2P computer system 200. Furthermore, the execution of network protocols by the processors, ASIC devices, and/or graphics processing units (e.g., GPUs) of full node computing devices 210A-210F may cause full node computing devices 210A-210F to execute network functions related to blockchain 114 and thereby maintain decentralized P2P network 270. The smart contracts node of blockchain 114 may be one of full node computing devices 210A-210F as the smart contracts node may cause functions to be executed within decentralized P2P computer system 200.

Lightweight node computing devices 250A and 250B may request execution of network functions related to blockchain 114 in decentralized P2P network 201. In order to request execution of network functions, such as electing at least one enterprise artifact protection protocol based on at least one sample implementation, processors of lightweight node computing devices 250A and 250B may execute network commands to broadcast the network functions to decentralized P2P network 270 comprising full node computing devices 210A-210F. Each node of the plurality of team nodes may be one of lightweight node computing devices 250A or 250B (or additional lightweight node computing devices not pictured in FIG. 2) as each node of the plurality of team nodes may submit requests to elect at least one enterprise artifact protection protocol to decentralized P2P network 270.

In some arrangements, a plurality of network function requests may be broadcasted across decentralized P2P network 270. Processors, ASIC devices, and/or GPUs of full node computing devices 210A-210F may execute network protocols to receive broadcasts of each of the network functions through decentralized P2P network 270 and from the requesting entities, including lightweight node computing devices 250A and 250B.

Figures 3A, 3B:
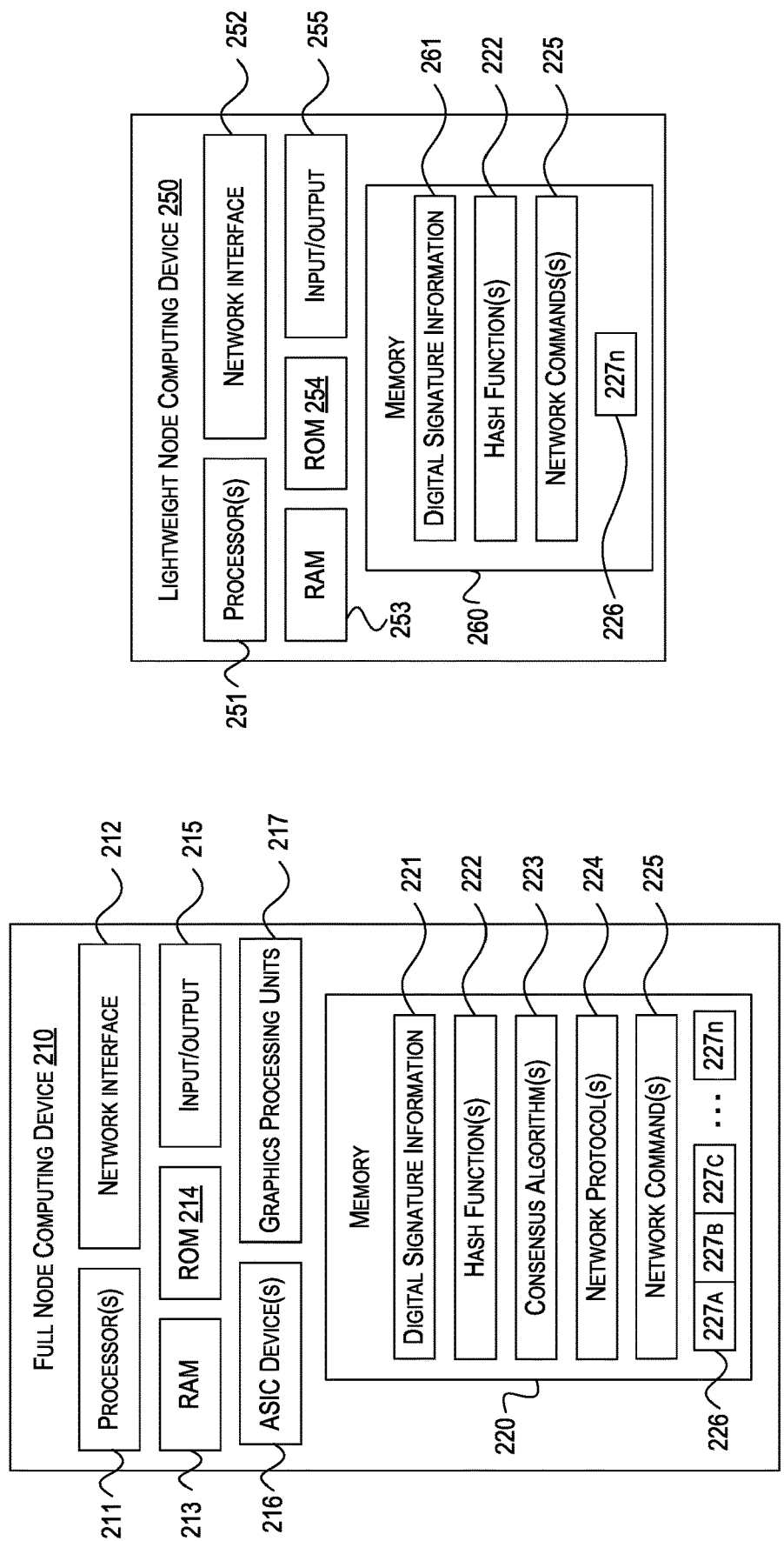
FIG. 3A depicts an illustrative example of a full node computing device that may be used for preserving enterprise artifacts using digital twin technology and intelligent smart contracts, in accordance with one or more example embodiments.
FIG. 3B depicts an illustrative example of a lightweight node computing device that may be used for preserving enterprise artifacts using digital twin technology and intelligent smart contracts, in accordance with one or more example embodiments.

FIG. 3A depicts an illustrative example of a full node computing device 210 that may be used for preserving, in real-time or near real-time, enterprise artifacts using digital twin technology and intelligent smart contracts, in accordance with one or more aspects described herein. Full node computing device 210 may be any of a personal computer, server computer, hand-held or laptop device, multiprocessor system, microprocessor-based system, set top box, programmable user electronic device, network personal computer, minicomputer, mainframe computer, distributed computing environment, virtual computing device, and the like and may operate in a decentralized P2P network. In some embodiments, full node computing device 210 may be configured to operate in a decentralized P2P network and to request execution of network functions, and/or to execute requested network functions and to maintain inter-nodal agreement as to the state of a blockchain of the decentralized P2P network.

Full node computing device 210 may include one or more processors 211, which control overall operation, at least in part, of full node computing device 210. Full node computing device 210 may further include random access memory (RAM) 213, read only memory (ROM) 214, network interface 212, input/output interfaces 215 (e.g., keyboard, mouse, display, printer), and memory 220. Input/output (I/O) 215 may include a variety of interface units and drives for reading, writing, displaying, and/or printing data or files. In some arrangements, full node computing device 210 may further comprise specialized hardware components such as application-specific integrated circuit (e.g., ASIC) devices 216 and/or graphics processing units (e.g., GPUs) 217. Such specialized hardware components may be used by full node computing device 210 in performing one or more of the processes involved in the execution of requested network functions and maintenance of inter-nodal agreement as to the state of a blockchain. Full node computing device 210 may further store in memory 220 operating system software for controlling overall operation of the full node computing device 210, control logic for instructing full node computing device 210 to perform aspects described herein, and other application software providing secondary support, and/or other functionality which may or might not be used in conjunction with aspects described herein.

Memory 220 may also store data and/or computer executable instructions used in performance of one or more aspects described herein. For example, memory 220 may store digital signature information 221 and one or more hash functions 222, consensus algorithms 223, network protocols 224, and network commands 225. In some arrangements, digital signature information 221, hash functions 222, and/or network commands 225 may comprise a wallet of full node computing device 210. Memory 220 may further store blockchain 114. Each of digital signature information 221, hash functions 222, consensus algorithms 223, network protocols 224, and network commands 225 may be used and/or executed by one or more processors 211, ASIC devices 216, and/or GPUs 217 of full node computing device 210 to create and maintain a decentralized P2P network, request execution of network functions, and/or execute requested network functions and maintain inter-nodal agreement as to the state of blockchain 114.

In order to request execution of network functions, such as a request to elect at least one enterprise artifact protection protocol, processors 211, ASIC devices 216, and/or GPUs 217 of full node computing device 210 may execute network commands 225 to broadcast the network function to a decentralized P2P network comprising a plurality of full nodes and/or lightweight nodes. The request may be digitally signed by full node computing device 210 with usage of the private/public key information and through execution of the digital signature algorithms of digital signature information 221. In order to execute requested network functions and maintain inter-nodal agreement as to the state of a blockchain, processors 211, ASIC devices 216, and/or GPUs 217 of full node computing device 210 may execute network protocols 224 to receive a broadcast of a requested network function through a decentralized P2P network and from a requesting entity such as a full node or lightweight node.

Memory 220 of full node computing device 210 may store blockchain 114. Blockchain 114 may include blocks 227A, 227B, 227C, . . . 227n, wherein block 227A represents the first block (e.g., genesis block) of blockchain 114 and block 227n represents the most immediate block of blockchain 114. As such, the blockchain 114, which may be a replica or copy of the blockchain of the decentralized P2P network in which full node computing device 210 operates, may be a full or complete copy of the blockchain of the decentralized P2P network. Each of the blocks within blockchain 114 may include information corresponding to the one or more network functions executed by the decentralized P2P network. As such, blockchain 114 as stored in memory 220 of full node computing device 210 may comprise the totality of network functions executed by the decentralized network.

FIG. 3B depicts an illustrative example of a lightweight node computing device 250 that may be used for preserving, in real-time or near real-time, enterprise artifacts using digital twin technology and intelligent smart contracts, in accordance with one or more aspects described herein. Lightweight node computing device 250 may be any of a personal computer, server computer, hand-held or laptop device, multiprocessor system, microprocessor-based system, set top box, programmable user electronic device, network personal computer, minicomputer, mainframe computer, distributed computing environment, virtual computing device, or the like, and may operate in a decentralized P2P network. In some embodiments, lightweight node computing device 250 may operate in a decentralized P2P network and may be configured to request execution of network functions through the decentralized P2P network. As such, lightweight node computing device 250 may be different from full node computing device 210 in that it might not be configured to execute network functions and/or to maintain a blockchain of a decentralized P2P network. In other aspects, lightweight node computing device 250 may have substantially the same physical configuration as full node computing device 210, but may be configured with different programs and/or software.

Lightweight node computing device 250 may include one or more processors 251, which control overall operation of lightweight node computing device 250. Lightweight node computing device 250 may further include random access memory (RAM) 253, read only memory (ROM) 254, network interface 252, input/output interfaces 255 (e.g., keyboard, mouse, display, printer), and memory 260. Input/output (I/O) 255 may include a variety of interface units and drives for reading, writing, displaying, and/or printing data or files. Lightweight node computing device 250 may store in memory 260 operating system software for controlling overall operation of the lightweight node computing device 250, control logic for instructing lightweight node computing device 250 to perform aspects described herein, and other application software providing secondary support and/or other functionality, which may or might not be used in conjunction with aspects described herein.

In comparison to full node computing device 210, lightweight node computing device 250 might not include, in some instances, specialized hardware such as ASIC devices 216 and/or GPUs 217. This may be because lightweight node computing device 250 might not be configured to execute network functions and/or to maintain a blockchain of a decentralized P2P network as is full node computing device 210.

Memory 260 of lightweight node computing device 250 may store data and/or computer executable instructions used in performance of one or more aspects described herein. For example, memory 260 may store digital signature information 261 and one or more hash functions 222 and network commands 225. In some arrangements, digital signature information 261, hash functions 222, and/or network commands 225 may comprise a wallet of lightweight node computing device 250. Each of hash functions 222 and network commands 225 stored in memory 260 of lightweight node computing device 250 may be respectively similar and/or identical to hash functions 222 and/or network commands 225 stored in memory 220 of full node computing device 210. Each of digital signature information 261 stored in memory 260 of lightweight node computing device 250 and digital signature information 221 stored in memory 220 of full node computing device 210 may comprise similar and/or identical digital signature algorithms. However, the private/public key information of digital signature information 261 stored in memory 260 of lightweight node computing device 250 may be different from that of the private/public key information of digital signature information 221 stored in memory 220 of full node computing device 210. The private/public key information of each node, whether full or lightweight, in a decentralized P2P computing network may be unique to that particular node.

Each of digital signature information 261, hash functions 222, and network commands 225 may be used and/or executed by one or more processors 251 of lightweight node computing device 250 to request execution of network functions in a decentralized P2P network. For example, in order to request execution of network functions, such as a request to elect at least one enterprise artifact protection protocol, processors 251 of lightweight node computing device 250 may execute network commands 225 to broadcast the network function to a decentralized P2P network comprising a plurality of full nodes and/or lightweight nodes. The request may be digitally signed by lightweight node computing device 250 with usage of the private/public key information and through execution of the digital signature algorithms of digital signature information 261.

Memory 260 of lightweight node computing device 250 may store blockchain 114. Blockchain 114 stored in memory 260 of lightweight node computing device 250 may include at least block 227n, wherein block 227n represents the most immediate block of blockchain 114. As such, blockchain 114, which may be a replica or copy of the blockchain of the decentralized P2P network in which lightweight node computing device 250 operates, may be a partial or incomplete copy of the blockchain of the decentralized P2P network. In some instances, however, blockchain 114 may include blocks 227A, 227B, 227C, . . . 227n, wherein block 227A represents the first block (e.g., genesis block) of blockchain 114 and block 227n represents the most immediate block of blockchain 114. As such, the blockchain 114 may be a full or complete copy of the blockchain of the decentralized P2P network. Each of the blocks within blockchain 114 may include information corresponding to the one or more network functions executed by the decentralized P2P network.

Preserving Enterprise Artifacts Using Digital Twin Technology and Intelligent Smart Contracts FIGS. 4A-4G depict an illustrative event sequence for preserving, in real-time or near real-time, enterprise artifacts using digital twin technology and intelligent smarts contracts, in accordance with one or more aspects described herein. While aspects described with respect to FIG. 4A to FIG. 5B include the evaluation of a single stream of internal data and a single stream of external data, a plurality of streams of internal data and a plurality and stream of external data may be received and evaluated (e.g., in parallel) without departing from the present disclosure.

Figure 4A:
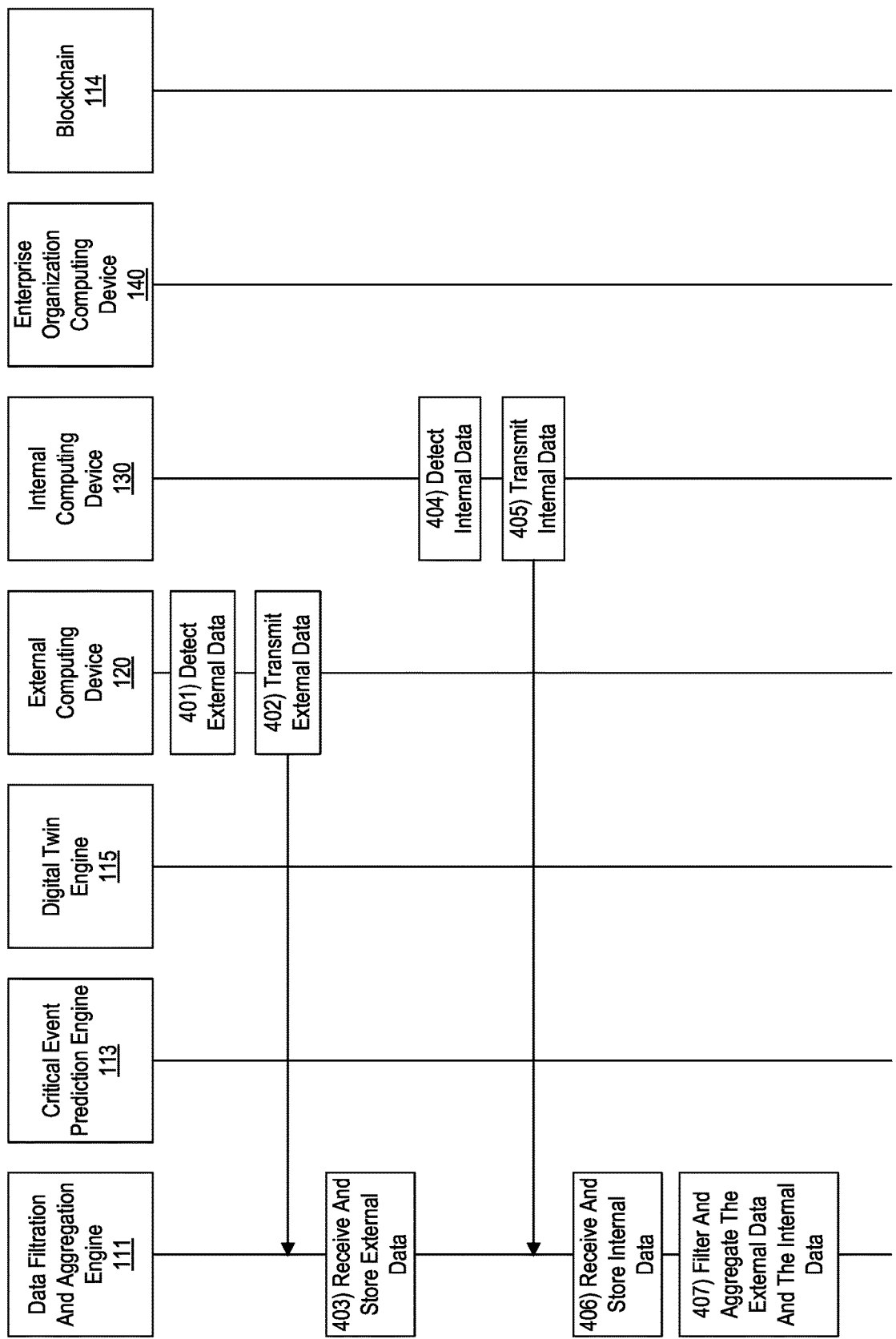

Referring to FIG. 4A, at step 401, external computing device 120 may continuously monitor real-world conditions (e.g., conditions that describe an environment surrounding an enterprise organization, conditions that describe an environment surrounding a data center, or the like). External computing device 120 may be configured to receive a stream of external data (e.g., local weather reports, natural disaster tracking, international news reports on resource shortages, domestic news reports on events occurring in a particular location, or the like) that corresponds to at least one of the geographic location of the enterprise organization or the geographic location of the data center.

At step 402, external computing device 120 may transmit the external data to data filtration and aggregation engine 111. At step 403, data filtration and aggregation engine 111 may receive the external data from external computing device 120 and may store the external data for additional processing, as discussed below.

At step 404, internal computing device 130 may continuously monitor conditions within the enterprise organization and/or within the data center. Internal computing device 130 may be configured to receive a stream of internal data (e.g., current CPU capacity, maximum CPU capacity, current load usage, maximum load capacity, system power levels, or the like) that may describe at least one internal condition that may correspond to the enterprise organization and/or may correspond to the data center.

At step 405, internal computing device 130 may transmit the internal data to data filtration and aggregation engine 111. At step 406, data filtration and aggregation engine 111 may receive the internal data from internal computing device 130 and may store the internal data for additional processing, as discussed below.

At step 407, data filtration and aggregation engine 111 may filter the received data into separate groups based on whether the data corresponds to a stream of external data or a stream of internal data. Data filtration and aggregation engine 111 may aggregate the streams of external data into an external data group and may aggregate the streams of internal data into an internal data group. Within the external data group, data filtration and aggregation engine 111 may parse each piece of external data to identify at least one data type and at least one data value that may correspond to the piece of external data. The identified data type may describe the corresponding data stream. For example, a data stream containing a weather report on an incoming hail storm may correspond to the data type "HAIL_STORM_ESSEXCTY, NJ," wherein ESSEXCTY,NJ may indicate that the location of hail storm is Essex County, New Jersey. The identified data value may describe the data type and/or data stream. For example, a data value that corresponds to "HAIL-_STORM_ESSEXCTY,NJ" may be "HAIL_2INCHES," wherein the 2INCHES may indicate an approximate size of the incoming hail.

Similarly, within the internal data group, data filtration and aggregation engine 111 may parse each piece of internal data to identify at least one data type and at least one data value that may correspond to the piece of internal data. The identified data type may describe the corresponding data stream. For example, a data stream containing a current power supply level within a first data center may correspond to the data type "DATA_CENTER1_POWER." The identified data value may describe the data type and/or data stream. For example, a data value that corresponds to "DATA_CENTER1_POWER" may be "90%."

Referring to FIG. 4B, at step 408, data filtration and aggregation engine 111 may generate a data structure to store each piece of external data and each piece of internal data. Data filtration and aggregation engine 111 may store each piece of external data and each piece of internal data within the data structure based on the previously identified data types (e.g., based on the stream to which each piece of data corresponds, or the like) and based on the previously identified data values that correspond to the previously identified data types. The data structure may indicate the plurality of data types and, as such, data filtration and aggregation engine 111 may use the plurality of data types to populate the data structure (e.g., match at least one previously identified data type to at least one data type indicated in the data structure and store each piece of external data (or each piece of internal data) based on the matching data types, or the like).

In some instances, data filtration and aggregation engine 111 may determine that at least one piece of external data or at least one piece of internal data might not correspond to the plurality of data types identified in the data structure. As such, data filtration and aggregation engine 111 may identify at least one additional data type that may correspond to the at least one piece of external data or the at least one piece of internal data, and may store the at least one piece of external data or the at least one piece of internal data in the data structure based on the at least one additional data type.

In some instances, data filtration and aggregation engine 111 may generate a portion of the data structure using the external data and the internal data. As such, data filtration and aggregation engine 111 may, upon filtering and aggregating new streams of data, add the newly filtered and aggregated data to the existing data structure by generating an additional portion of the existing data structure and by adding the additional portion to the existing data structure.

At step 409, data filtration and aggregation engine 111 may store the data structure and/or the portion of the data structure within aggregated data database 112. Upon receipt of an additional portion of the existing data structure, aggregated data database 112 may flag the previously received portions of the data structure as historic data (e.g., historic external data, historic internal data, or the like). In some instances, upon receipt of a new data structure, aggregated data database 112 may flag the previously receive data structures as historic data (e.g., historic external data, historic internal data, or the like). The historic external data may comprise external data that was previously analyzed and processed using the features and methods described herein. Similarly, the historic internal data may comprise internal data that was previously analyzed and processed using the features and methods described herein.

At step 410, critical event prediction engine 113 may retrieve, from aggregated data database 112, the data structure(s) and/or portions of the data structure, the historic external data, and the historic internal data. Critical event prediction engine 113 may identify the current external data, the current internal data, the historic external data, and the historic internal data. In some instances, critical event prediction engine 113 may identify the historic external data and the historic internal data based on whether the external data and/or the internal data was flagged, by aggregated data database 112, as historic external data and/or historic internal data.

At step 411, critical event prediction engine 113 may compare the external data (or the internal data) to the historic external data (or the historic internal data). Critical event prediction engine 113 may, using the data structure(s) and/or the portion of the data structure, compare the plurality of data types associated with the historic external data (or the historic internal data) to the plurality of data types associated with the external data (or the internal data).

Figure 4C:
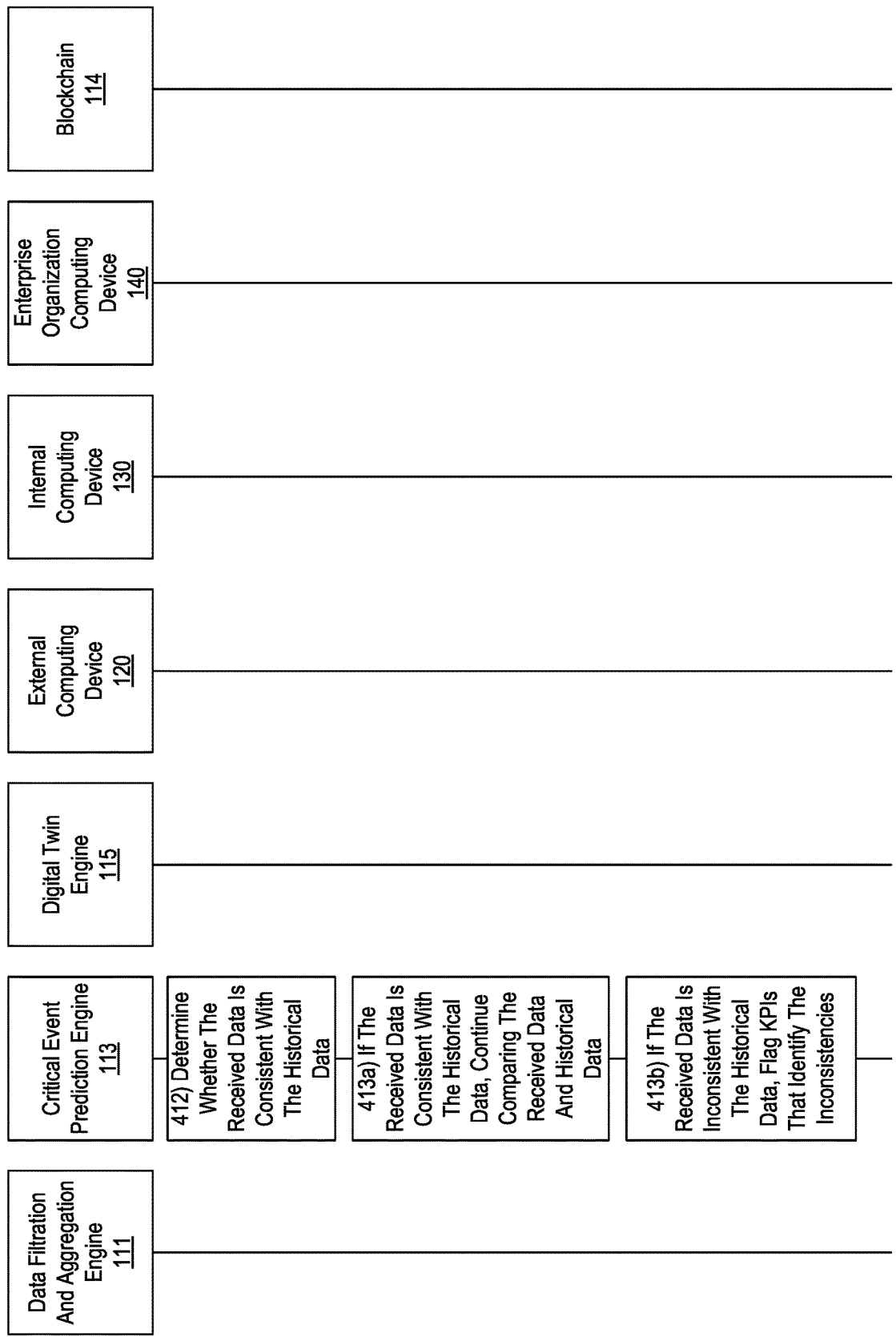

Referring to FIG. 4C, at step 412, critical event prediction engine 113 may determine, based on the previously described comparison, whether the external data (or the internal data) may be consistent with (e.g., correspond to, match, be similar to, or the like) the historical external data (or the historical internal data). If, at step 412, critical event prediction engine 113 determines that the external data (or the internal data) is consistent with the historical external data (or the historical internal data), then, at step 413a, critical event prediction engine 113 may continue analyzing the remaining external data (or the remaining internal data). In some instances, critical event prediction engine 113 may determine that the external data (or the internal data) might not have been previously received (e.g., there might not be historic external data (or historic internal data) to which critical event prediction engine 113 may compare the current external data (or the current internal data), or the like). As such, critical event prediction engine 113 may terminate analysis on the external data (or the internal data) that might not have been previously received and may analyze the remaining external data (or the remaining internal data).

In some instances, critical event prediction engine 113 may determine that at least one data type associated with the external data (or the internal data) may correspond to (e.g., match, be similar to, or the like) at least one data type associated with the historic external data (or the historic internal data). Critical event prediction engine 113 may compare the data value that corresponds to the data type associated with the external data (or the internal data) to the data value that corresponds to the data type associated with the historic external data (or the historic internal data). Critical event prediction engine 113 may determine whether the data value that corresponds to the data type associated with the external data (or the internal data) is consistent with (e.g., matches, is within a predetermined range, or the like) the data value that corresponds to the data type associated with the historic external data (or the historic internal data). In some instances, critical event prediction engine 113 may determine that the data values are consistent (e.g., match, are within the predetermined range, or the like). As such, critical event prediction engine 113 might not flag the data value that corresponds to the data type associated with the external data (or the internal data). Critical event prediction engine 113 may analyze the remaining external data (or the remaining internal data), if any.

Alternatively, if, at step 412, critical event prediction engine 113 determines that the external data (or the internal data) might not be consistent with the historical external data (or the historical internal data), then, at step 413b, critical event prediction engine 113 may identify the inconsistency between the data value that corresponds to the data type associated with the external data (or the internal data) and the data value that corresponds to the data type associated with the historical external data (or the historical internal data). Critical event prediction engine 113 may identify the inconsistency using a key performance indicator (KPI). The KPI may specify a feature (e.g., measurement, parameter, or the like) of the data type that corresponds to the external data (or the internal data) that may be different from the same KPI (e.g., measurement, parameter, or the like) of the data type that corresponds to the historic external data (or the historic internal data). Critical event prediction engine 113 may flag the KPI that identifies the inconsistency between the data value that corresponds to the data type associated with the external data (or the internal data) and the data value that corresponds to the data type associated with the historic external data (or the historic internal data).

Figure 4D:
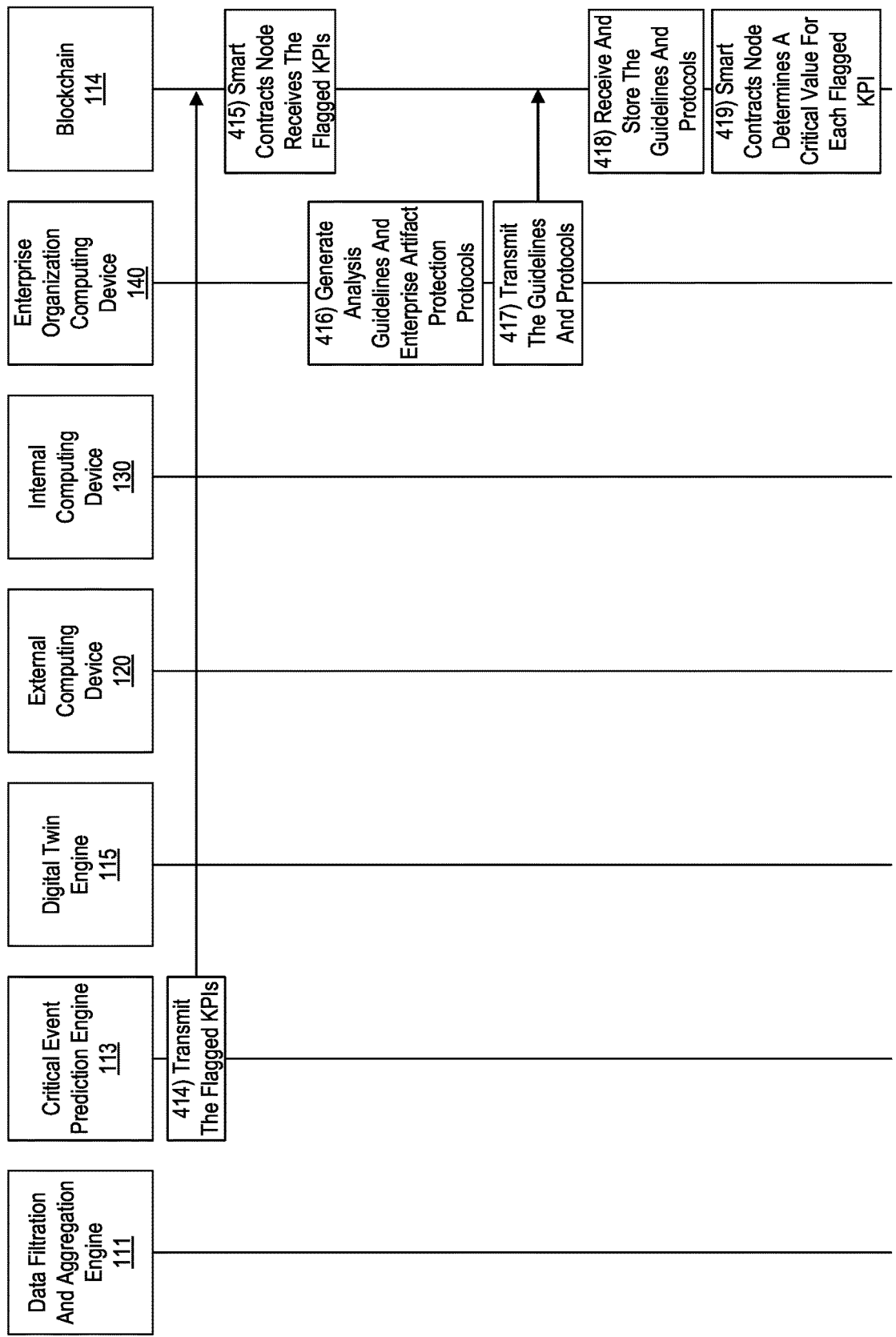

Referring to FIG. 4D, at step 414, critical event prediction engine 113 may transmit, to blockchain 114, the at least one flagged KPI, the data type and data value that correspond to the external data (or the internal data), and the data type and data value that correspond to the historic external data (or the historic internal data). At step 415, blockchain 114 may receive the at least one flagged KPI, the data type and data value that correspond to the external data (or the internal data), and the data type and data value that correspond to the historic external data (or the historic internal data). In particular, the smart contracts node on blockchain 114 may receive the at least one flagged KPI, the data type and data value that correspond to the external data (or the internal data), and the data type and data value that correspond to the historic external data (or the historic internal data), and may store the received data in data blocks on the blockchain.

At step 416, enterprise organization computing device 140 may generate a plurality of analysis guidelines. Each team node, of the plurality of team nodes on blockchain 114, may use the plurality of analysis guidelines to determine whether a flagged KPI may threaten the security of the enterprise artifacts. In some instances, the plurality of analysis guidelines may instruct each team node to review enterprise organization rules specific to the particular team and/or department within the enterprise organization. The plurality of analysis guidelines may instruct each team node to compare the flagged KPI to the enterprise organization rules specific to the particular team and/or department to determine whether the flagged KPI violates at least one enterprise organization rule. If the team node determines that the flagged KPI violates at least one enterprise organization rule, then the plurality of analysis guidelines may instruct the team node to identify the flagged KPI as a potential threat to the security of the enterprise artifacts. The plurality of analysis guidelines may further instruct the team node to identify the at least one enterprise organization rule that the flagged KPI may violate. Alternatively, if the team node determines that the flagged KPI might not violate the enterprise organization rules, then the plurality of analysis guidelines may instruct the team node to identify the flagged KPI as non-threatening to the security of the enterprise artifacts. In some instances, the team node might not be able to determine whether the flagged KPI violates at least one enterprise organization rule (e.g., due to ambiguities within the at least one enterprise organization rule, due to a cross reference to at least one enterprise organization rule associated with a different and/or additional team and/or department within the enterprise organization, or the like). In such instances, the plurality of analysis guidelines may instruct the team node to identify the flagged KPI as potentially threatening to the security of the enterprise artifacts and to recommend that the flagged KPI undergo manual analysis (e.g., by an agent on the team and/or department that corresponds to the team node).

Enterprise organization computing device 140 may further be configured to generate a plurality of enterprise artifact protection protocols. An enterprise artifact protection protocol may comprise a series of instructions which, when executed, may protect the enterprise artifacts from scenarios that may potentially threaten (e.g., impact, weaken, or the like) the security of the enterprise artifacts. As such, when executed, the enterprise artifact protection protocols may increase and/or preserve the security of the enterprise artifacts.

To generate the plurality of enterprise artifact protection protocols, enterprise organization computing device 140 may predict a plurality of events that may threaten the security of the enterprise artifacts (e.g., a power outage at the data center due to an ice storm, CPU usage within the enterprise organization approaching maximum CPU capacity, or the like). To predict the plurality of events that may threaten the security of the enterprise artifacts, enterprise organization computing device 140 may analyze the historic external data and the historic internal data (e.g., external data and internal data that was previously received and processed using the features described herein, or the like). Enterprise organization computing device 140 may determine countermeasures that, when executed, may protect the enterprise artifacts and may use the countermeasures to generate the plurality of enterprise artifact protection protocols. Enterprise organization computing device 140 may draft code, using at least one programming language, that, when executed, may initiate the corresponding enterprise artifact protection protocol. In some instances, enterprise organization computing device 140 may draft code, using at least one programming language, that corresponds to a sample implementation of at least one enterprise artifact protection protocol (e.g., a sample implementation of a feature of at least one enterprise artifact protection protocol, or the like) and that, when executed, may initiate the corresponding sample implementation of the enterprise artifact protection protocol.

At step 417, enterprise organization computing device 140 may transmit the plurality of analysis guidelines and the plurality of enterprise artifact protection protocols to blockchain 114. At step 418, blockchain 114 (e.g., the smart contracts node on blockchain 114) may store each analysis guideline, of the plurality of analysis guidelines, within a different data block of a plurality of data blocks on blockchain 114. Similarly, blockchain 114 (e.g., the smart contracts node on blockchain 114) may store each enterprise artifact protection protocol, of the plurality of enterprise artifact protection protocols, within a different data block of the plurality of data blocks on blockchain 114.

In some instances, enterprise organization computing device 140 may modify an existing analysis guideline and/or an existing enterprise artifact protection protocol. Enterprise organization computing device 140 may transmit the modifications to blockchain 114 and may instruct blockchain 114 (e.g., the smart contracts node on blockchain 114) to store each modification within a different data block of the plurality of data blocks on blockchain 114. Enterprise organization computing device 140 may further instruct blockchain 114 to execute the modified analysis guidelines and/or the modified enterprise artifact protection protocol (e.g., as opposed to the original analysis guideline and/or the original enterprise artifact protection protocol).

At step 419, the smart contracts node on blockchain 114 may use the at least one flagged KPI, the data type and data value that correspond to the external data (or the internal data), and the data type and data value that correspond to the historic external data (or the historic internal data) to determine a critical value for each of the at least one flagged KPIs. The critical value that corresponds to the flagged KPI may indicate a predicted degree of whether and/or how much the flagged KPI may threaten (e.g., harm, weaken, or the like) the security of the enterprise artifacts. The critical value may be within a predetermined range (e.g., a scale from 0.0 to 10.0). A critical value may be associated with a first level critical value if the critical value is closer to 0.0. A critical value that may be associated with the first level critical value may indicate that the corresponding flagged KPI might not pose a threat to the security of the enterprise artifacts. Alternatively, a critical value may be associated with a second level critical value if the critical value is closer 10.0. A critical value that may be associated with the second level critical value may indicate that the corresponding flagged KPI may pose a threat to the security of the enterprise artifacts.

To determine the critical value that corresponds to the flagged KPI, the smart contracts node may consider a plurality of conditions that may predict the degree of impact that the flagged KPI may inflict upon the enterprise organization and/or the data center and, by extension, the security of the enterprise artifacts. In some instances, the smart contracts node may consider the urgency of the flagged KPI (e.g., a predicted amount of time remaining before a natural disaster causes the enterprise organization and/or the data center to experience power failure, or the like), the current state of the flagged KPI (e.g., whether the enterprise organization and/or the data center commenced power failure recovery procedures, or the like), the predicted wind down period of the flagged KPI (e.g., a predicted amount of time until the completion of an enterprise operation that may overload the current CPU capacity, or the like), and/or the likelihood of the flagged KPI passing (e.g., a likelihood of a tornado's path turning away from the enterprise organization and/or the data center, or the like).

Figure 4E:
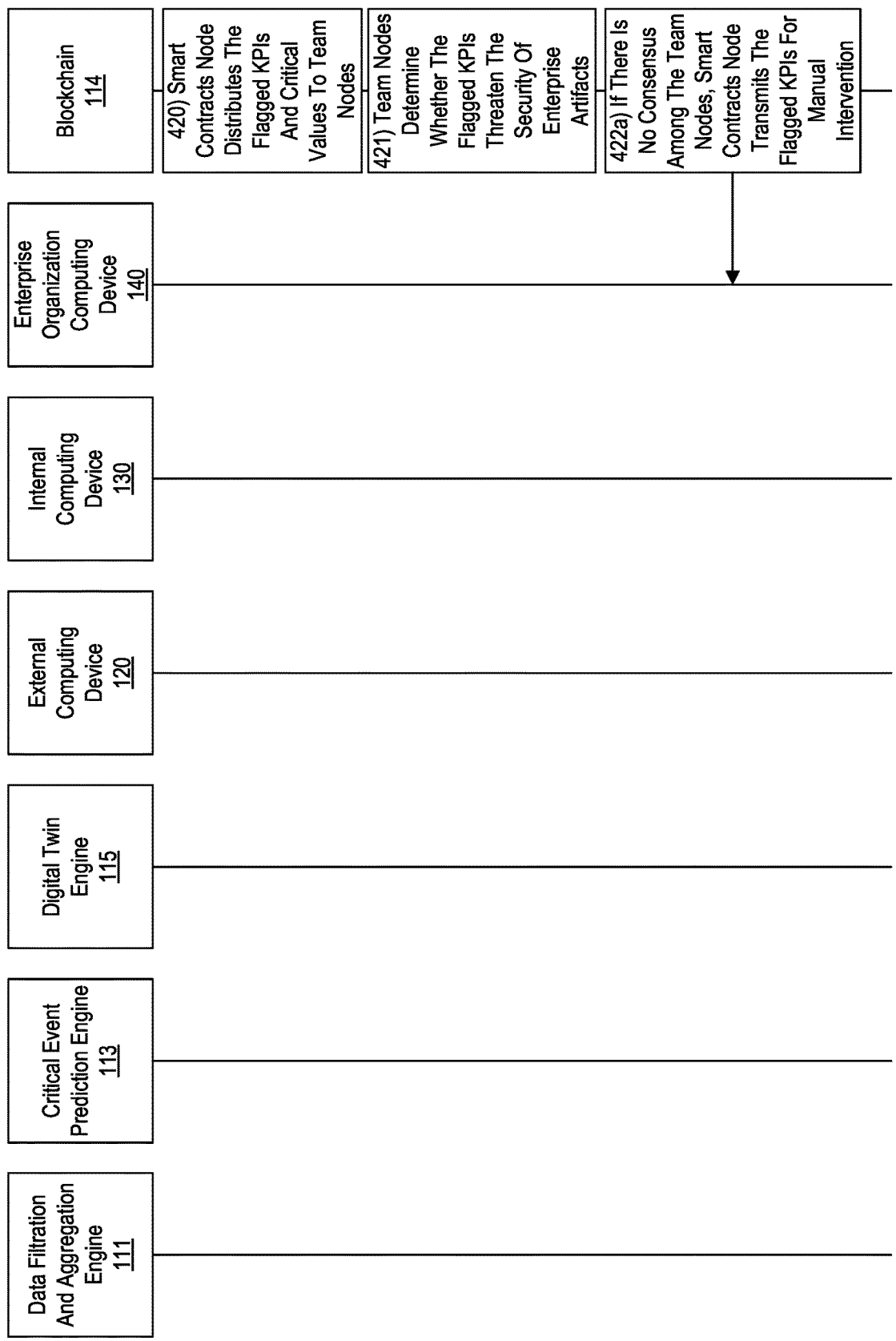

Referring to FIG. 4E, at step 420, the smart contracts node on blockchain 114 may distribute the at least one flagged KPI and the critical values that correspond to the at least one flagged KPI to the plurality of team nodes on blockchain 114. At step 421, the plurality of team nodes on blockchain 114 may receive, from the smart contracts node, the at least one flagged KPI and the critical value associated with each flagged KPI. Each team node of the plurality of team nodes may use the plurality of analysis guidelines, received by blockchain 114 and from enterprise organization computing device 140, to determine whether the flagged KPI may threaten the security of the enterprise artifacts. To do so, in some instances, the plurality of analysis guidelines may instruct each team node to review the enterprise organization rules specific to the particular team and/or department within the enterprise organization. The plurality of analysis guidelines may instruct each team node to compare the flagged KPI to the enterprise organization rules specific to the particular team and/or department to determine whether the flagged KPI may violate at least one enterprise organization rule.

If the team node determines that the flagged KPI may violate at least one enterprise organization rule, then the plurality of analysis guidelines may instruct the team node to identify the flagged KPI as a potential threat to the security of the enterprise artifacts. The plurality of analysis guidelines may further instruct the team node to identify the at least one enterprise organization rule that the flagged KPI may violate. Alternatively, if the team node determines that the flagged KPI might not violate the enterprise organization rules, then the plurality of analysis guidelines may instruct the team node to identify the flagged KPI as non-threatening to the security of the enterprise artifacts. In some instances, the team node might not be able to determine whether the flagged KPI may violate at least one enterprise organization rule (e.g., due to ambiguous language within the enterprise organization rule, due to a cross reference to at least one enterprise organization rule associated with a different team and/or department, or the like). In such instances, the plurality of analysis guidelines may instruct the team node to identify the flagged KPI as potentially threatening to the security of the enterprise artifacts and to recommend that the flagged KPI undergo manual analysis (e.g., by an agent on the team and/or department that corresponds to the team node, or the like). Each team node of the plurality of team nodes may transmit the determination (e.g., that the flagged KPI violates at least one enterprise organization rule, that the flagged KPI might not violate the enterprise organization rules, that it may be unclear whether the flagged KPI violates at least one enterprise organization rule, or the like) to the smart contracts node.

At step 422a, the smart contracts node may receive, from at least one team node of the plurality of team nodes, an indication that the flagged KPI might not threaten the security of the enterprise artifacts and may receive, from at least one different team node of the plurality of team nodes, an indication that the flagged KPI may threaten the security of the enterprise artifacts (e.g., there might not be consensus among the team nodes, or the like). In such instances, the smart contracts node may transmit the flagged KPI and the critical value associated with the flagged KPI to enterprise organization computing device 140. The smart contracts node may also transmit, to enterprise organization computing device 140, instructions to manually analyze the flagged KPI and the critical value associated with the flagged KPI.

Figure 4F:
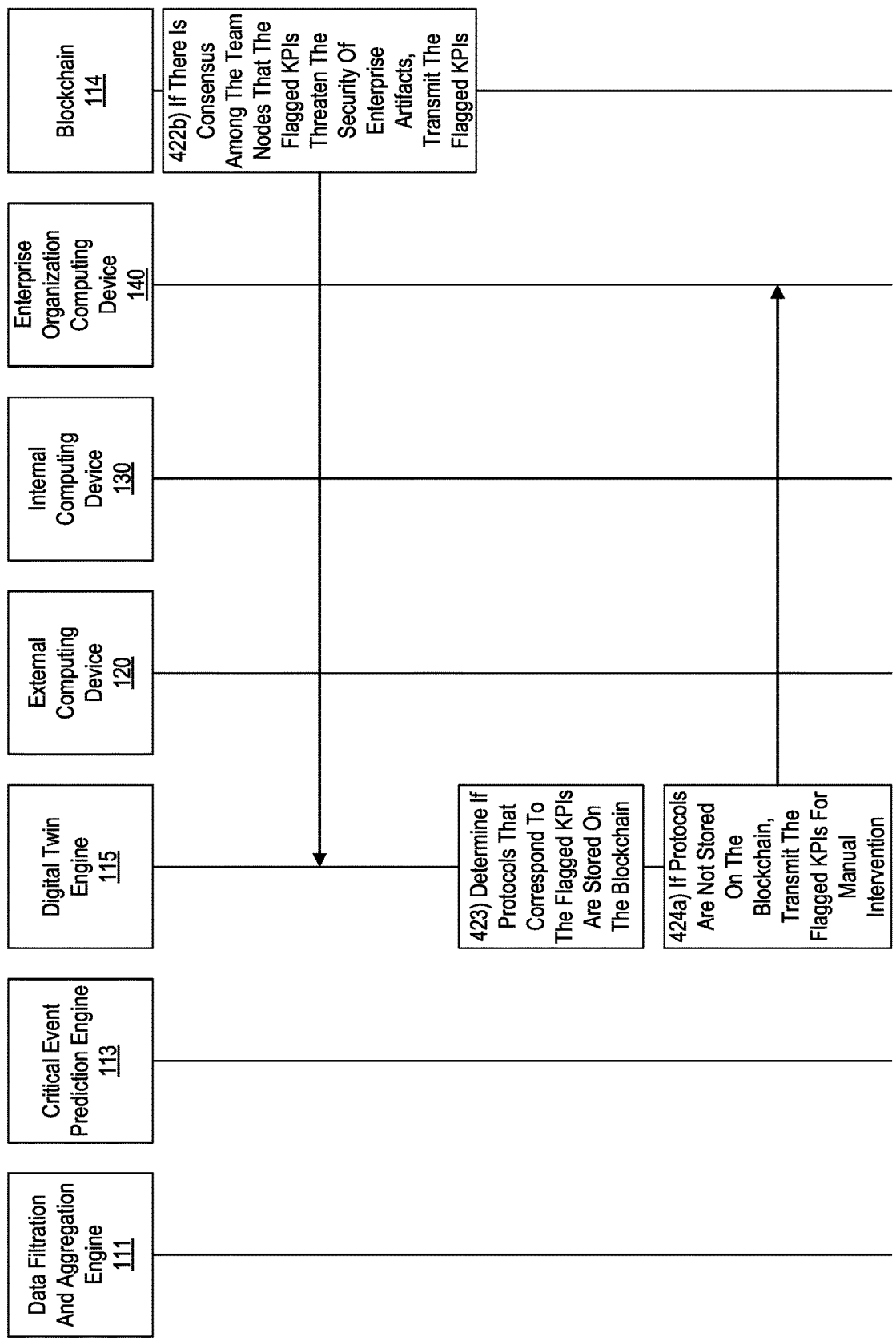

Alternatively, referring to FIG. 4F and at step 422b, the smart contracts node may receive, from each team node of the plurality of team nodes, an indication that the flagged KPI may threaten the security of the enterprise artifacts (e.g., there may be consensus among the team nodes that the flagged KPI may threaten the security of the enterprise artifacts). The smart contracts node may transmit the flagged KPI to digital twin engine 115.

At step 423, digital twin engine 115 may parse the flagged KPI and may determine whether at least one enterprise artifact protection protocol that corresponds to the flagged KPI is stored in blockchain 114. If, at step 423, digital twin engine 115 determines that blockchain 114 might not contain at least one enterprise artifact protection protocol that corresponds to the flagged KPI, then, at step 424a, digital twin engine 115 may transmit the flagged KPI to enterprise organization computing device 140 along with a notification indicating that blockchain 114 might not contain an enterprise artifact protection protocol that addresses the flagged KPI. Digital twin engine 115 may further transmit, to enterprise organization computing device 140, a request for the flagged KPI to be manually analyzed by a team and/or department within the enterprise organization.

Figure 4G:
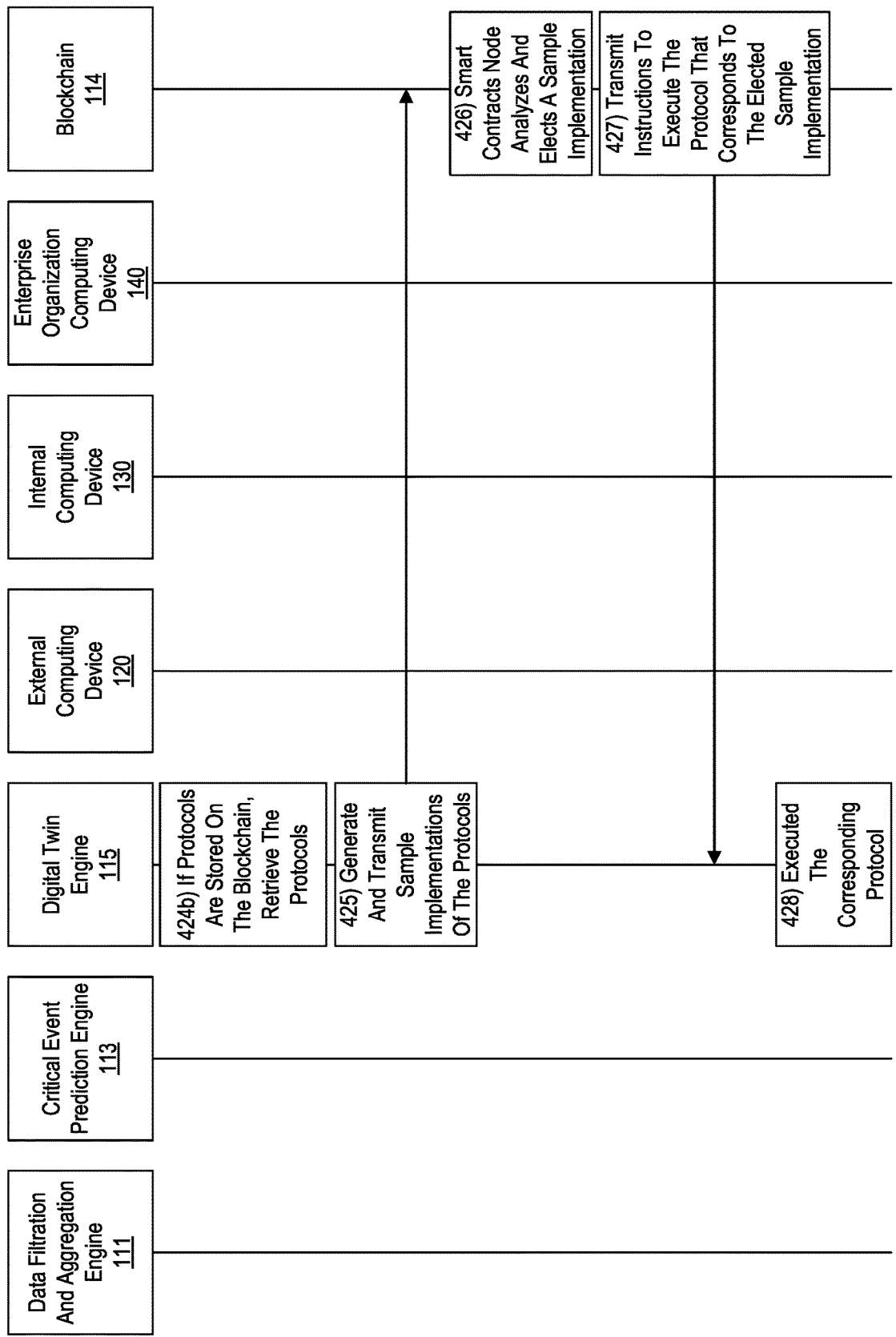

Alternatively, if, at step 423, digital twin engine 115 determines that at least one enterprise artifact protection protocol that corresponds to the flagged KPI is stored on blockchain 114, then, referring to FIG. 4G and at step 424b, digital twin engine 115 may parse the flagged KPI and may retrieve, from blockchain 114 and based on the parsing, the at least one enterprise artifact protection protocol that corresponds to the flagged KPI. The at least one enterprise artifact protection protocol may comprise a series of instructions which, when executed, may protect the enterprise artifacts from scenarios (e.g., from the flagged KPI, or the like) that may potentially threaten (e.g., impact, weaken, or the like) the security of the enterprise artifacts. As such, when executed, the enterprise artifact protection protocol may increase and/or preserve the security of the enterprise artifacts.

At step 425, digital twin engine 115 may identify at least one enterprise artifact protection protocol that corresponds to the flagged KPI (e.g., addresses at least one scenario where the flagged KPI harms the security of the enterprise artifacts, or the like). Digital twin engine 115 may generate a sample implementation of the at least one identified enterprise artifact protection protocol. To generate the sample implementation, digital twin engine 115 may locate and retrieve, from blockchain 114, code that corresponds to the sample implementation of at least one feature of the at least one enterprise artifact protection protocol. Digital twin engine 115 may execute the code that corresponds to the sample implementation of the at least one feature of the at least one enterprise artifact protection protocol. In doing so, digital twin engine 115 may illustrate how the enterprise artifacts may be protected from the flagged KPI (e.g., illustrate how changing the storage location of the enterprise artifacts may increase the level of security surrounding the enterprise artifacts, illustrate how transmitting an enterprise organization operation from a first location to a second location may preserve the power supply associated with the first location, or the like). Digital twin engine 115 may transmit the sample implementation to blockchain 114. In some instances, digital twin engine 115 may transmit the sample implementation to the smart contracts node of blockchain 114.

At step 426, the smart contracts node on blockchain 114 may receive, from digital twin engine 115, at least one sample implementation of at least one feature of at least one enterprise artifact protection protocol. The smart contracts node may analyze each sample implementation and may elect an enterprise artifact protection protocol, which may be used to safeguard the enterprise artifacts from the flagged KPI. In some instances, the smart contracts node on blockchain 114 may be configured to elect (e.g., automatically, or the like) at least one enterprise artifact protection protocol based on considering a plurality of conditions. In some instances, the smart contracts node may consider whether electing a particular enterprise artifact protection protocol may jeopardize (e.g., negatively affect, or the like) at least one enterprise artifact (e.g., if transmitting a first enterprise organization operation from a first data center to a second data center may interrupt a second enterprise organization operation, then do not elect the enterprise artifact protection protocol that may transmit the first enterprise organization operation from the first data center to the second data center, or the like). In some instances, the smart contracts node may consider whether electing a particular enterprise artifact protection protocol may further threaten the security of the enterprise artifacts (e.g., if initiating a back-up power sequence may overload the current power supply capacity within the enterprise organization, then do not elect the enterprise artifact protection protocol that may initiate the back-up power sequence as that may cause the enterprise organization to experience power failure, or the like). In some instances, the smart contracts node may determine whether a particular enterprise artifact protection protocol should be elected based on present conditions and known dangers (e.g., when the location of a first data center is likely to experience high winds from an incoming hurricane, elect at least one enterprise artifact protection protocol that may replicate the enterprise artifacts and transmit the replicated enterprise artifacts to a second data center since the first data center has, historically, been unable to maintain a steady power supply during hurricane-like winds, or the like). The smart contracts node may, based on the analysis, elect at least one enterprise artifact protection protocol.

At step 427, blockchain 114 (e.g., the smart contracts node on blockchain 114) may transmit, to digital twin engine 115, a notification indicating the at least one elected enterprise artifact protection protocol. The smart contracts node may further transmit, to digital twin engine 115, instructions to execute the at least one elected enterprise artifact protection protocol.

At step 428, digital twin engine 115 may receive, from the smart contracts node on the blockchain, an indication of at least one enterprise artifact protection protocol to be executed. Digital twin engine 115 may locate and retrieve, from blockchain 114, code that corresponds to the at least one enterprise artifact protection protocol elected by blockchain 114. Digital twin engine 115 may execute the code that corresponds to the at least one enterprise artifact protection protocol elected by blockchain 114.

In some instances, digital twin engine 115 may be configured to transmit the enterprise artifacts from a first location (e.g., from within the enterprise organization and/or the data center, or the like) to a second location (e.g., a location that may be different from the location of the enterprise organization and/or the data center, or the like). To do so, the code executed by digital twin engine 115 may configure digital twin engine 115 to identify (e.g., from a list of predetermined, secure locations, or the like) the second location and to transmit, using a plurality of data packets, the enterprise artifacts. In some instances, each data packet of the plurality of data packets may comprise a component of the enterprise artifacts (e.g., a portion of enterprise organization data, a portion of an enterprise organization application, a portion of an enterprise organization operation, or the like). Digital twin engine 115 may transmit the plurality of data packets to the second location (e.g., a second, secure data center, or the like) and may instruct at least one computing device at the second location to organize the received data packets such that the received data packets reflect the enterprise artifacts as they existed within the first location.

In some instances, digital twin engine 115 may be configured to duplicate the enterprise artifacts and to transmit the duplications to the second location. To do so, the code executed by digital twin engine 115 may configure digital twin engine 115 to duplicate each data packet such that, when combined, the totality of (or a predetermined subset of) the duplicated data packets may comprise the totality of (or a predetermined subset of) the enterprise artifacts. Digital twin engine 115 may further be configured to replicate each data packet and to transmit each replicated data packet to the second location. Digital twin engine 115 may transmit, to at least one computing device at the second location, instructions to organize the received replications of the data packets such that the organization of the replications of the data packets reflect the enterprise artifacts (or the predetermined subset of the enterprise artifacts) as they existed within the first location.

Figure 5A:
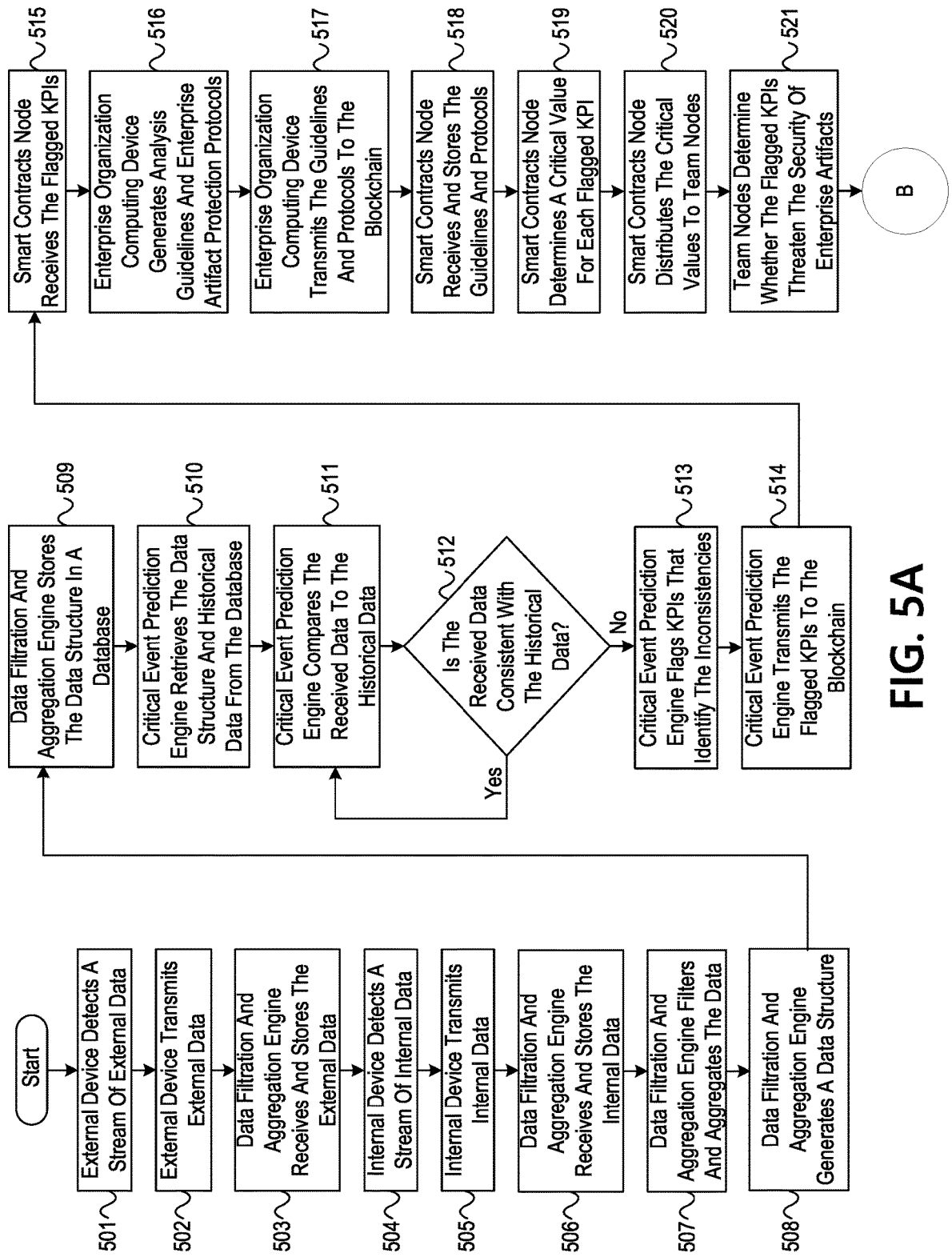
FIG. 5A-5B depict an illustrative method for preserving enterprise artifacts using digital twin technology and intelligent smart contracts, in accordance with one or more example embodiments.
Figure 5B:
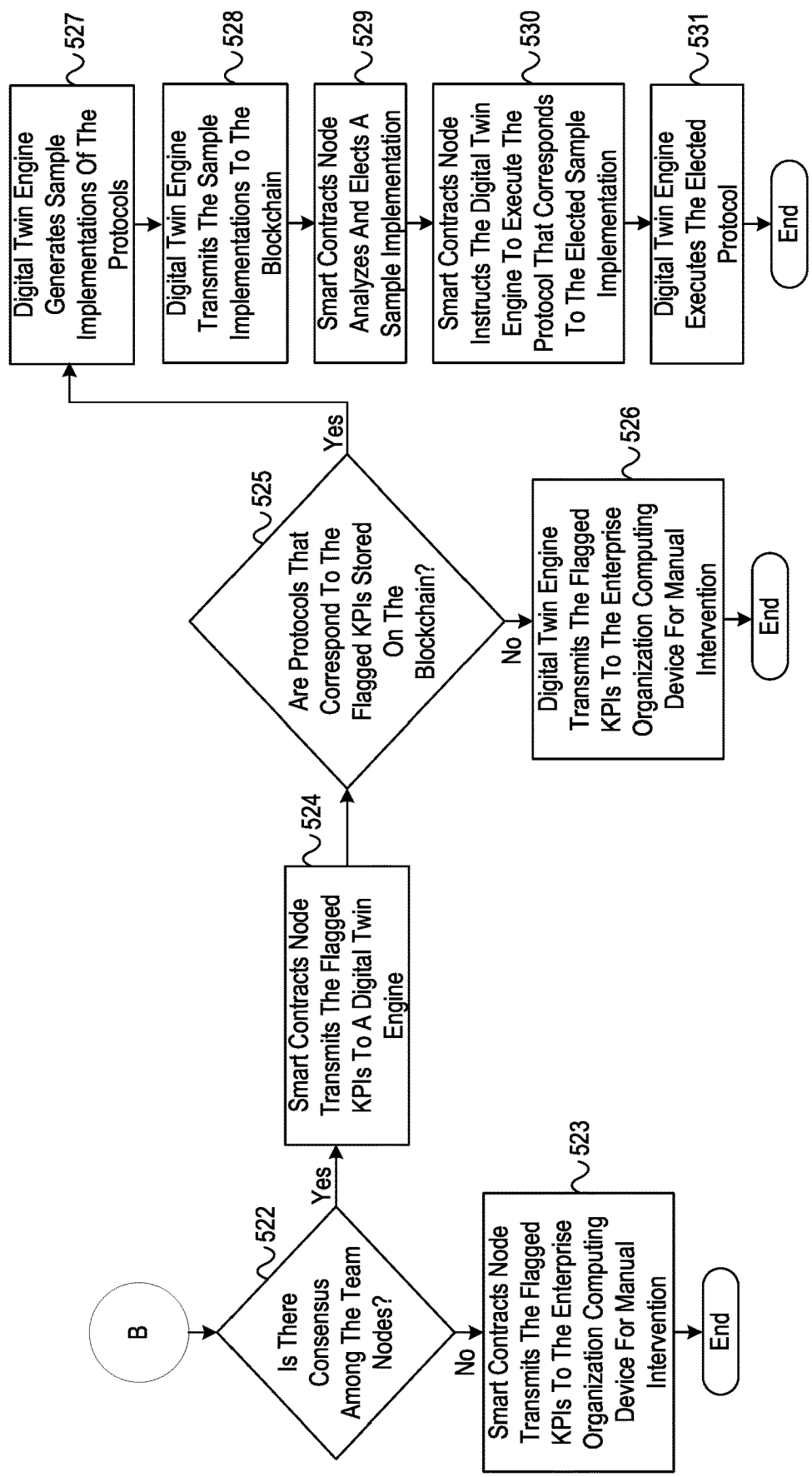

FIGS. 5A-5B depicts a flow diagram illustrating one example method for preserving, in real-time or near real-time, enterprise artifacts using digital twin technology and intelligent smart contracts, in accordance with one or more aspects described herein. The processes illustrated in FIGS. 5A-5B are merely sample processes and functions. The steps shown may be performed in the order shown, in a different order, more steps may be added, or one or more steps may be omitted, without departing from the disclosure. In some examples, one or more steps may be performed simultaneously with other steps shown and described. Further, one or more steps described with respect to FIGS. 5A-5B may be performed in real-time or near real-time.

Referring to FIG. 5A, at step 501, external computing device 120 may continuously monitor real-world conditions (e.g., conditions that describe an environment surrounding an enterprise organization, conditions that describe an environment surrounding a data center, or the like). External computing device 120 may be configured to receive a stream of external data (e.g., local weather reports, natural disaster tracking, international news reports on resource shortages, domestic news reports on events occurring in a particular location, or the like) that corresponds to at least one of the geographic location of the enterprise organization or the geographic location of the data center.

At step 502, external computing device 120 may transmit the external data to data filtration and aggregation engine 111.

At step 503, data filtration and aggregation engine 111 may receive and store the external data for additional processing, as discussed below.

At step 504, internal computing device 130 may continuously monitor conditions within the enterprise organization and/or within the data center. Internal computing device 130 may be configured to receive a stream of internal data (e.g., current CPU capacity, maximum CPU capacity, current load usage, maximum load capacity, system power levels, or the like) that may describe at least one internal condition that may correspond to the enterprise organization and/or may correspond to the data center.

At step 505, internal computing device 130 may transmit the internal data to data filtration and aggregation engine 111.

At step 506, data filtration and aggregation engine 111 may receive and store the internal data for additional processing, as discussed below.

At step 507, data filtration and aggregation engine 111 may filter the received data into separate groups based on whether the data corresponds to a stream of external data or a stream of internal data. Data filtration and aggregation engine 111 may aggregate the streams of external data into an external data group and may aggregate the streams of internal data into an internal data group. Within the external data group, data filtration and aggregation engine 111 may parse each piece of external data to identify at least one data type and at least one data value that may correspond to the piece of external data. The identified data type may describe the corresponding data stream. The identified data value may describe the data type and/or data stream.

Similarly, within the internal data group, data filtration and aggregation engine 111 may parse each piece of internal data to identify at least one data type and at least one data value that may correspond to the piece of internal data. The identified data type may describe the corresponding data stream. The identified data value may describe the data type and/or data stream.

At step 508, data filtration and aggregation engine 111 may generate a data structure to store each piece of external data and each piece of internal data. Data filtration and aggregation engine 111 may store each piece of external data and each piece of internal data within the data structure based on the previously identified data types (e.g., based on the stream to which each piece of data corresponds, or the like) and based on the previously identified data values that correspond to the previously identified data types. The data structure may indicate the plurality of data types and, as such, data filtration and aggregation engine 111 may use the plurality of data types to populate the data structure (e.g., match at least one previously identified data type to at least one data type indicated in the data structure and store each piece of external data (or each piece of internal data) based on the matching data types, or the like).

In some instances, data filtration and aggregation engine 111 may determine that at least one piece of external data or at least one piece of internal data might not correspond to the plurality of data types identified in the data structure. As such, data filtration and aggregation engine 111 may identify at least one additional data type that may correspond to the at least one piece of external data or the at least one piece of internal data, and may store the at least one piece of external data or the at least one piece of internal data in the data structure based on the at least one additional data type.

In some instances, data filtration and aggregation engine 111 may generate a portion of the data structure using the external data and the internal data. As such, data filtration and aggregation engine 111 may, upon filtering and aggregating new streams of data, add the newly filtered and aggregated data to the existing data structure by generating an additional portion of the existing data structure and by adding the additional portion to the existing data structure.

At step 509, data filtration and aggregation engine 111 may store the data structure and/or the portion of the data structure within aggregated data database 112. Upon receipt of an additional portion of the existing data structure, aggregated data database 112 may flag the previously received portions of the data structure as historic data (e.g., historic external data, historic internal data, or the like). In some instances, upon receipt of a new data structure, aggregated data database 112 may flag the previously receive data structures as historic data (e.g., historic external data, historic internal data, or the like). The historic external data may comprise external data that was previously analyzed and processed using the features and methods described herein. Similarly, the historic internal data may comprise internal data that was previously analyzed and processed using the features and methods described herein.

At step 510, critical event prediction engine 113 may retrieve, from aggregated data database 112, the data structure(s) and/or portions of the data structure, the historic external data, and the historic internal data. Critical event prediction engine 113 may identify the current external data, the current internal data, the historic external data, and the historic internal data. In some instances, critical event prediction engine 113 may identify the historic external data and the historic internal data based on whether the external data and/or the internal data was flagged, by aggregated data database 112, as historic external data and/or historic internal data.

At step 511, critical event prediction engine 113 may compare the external data (or the internal data) to the historic external data (or the historic internal data). Critical event prediction engine 113 may, using the data structure(s) and/or the portion of the data structure, compare the plurality of data types associated with the historic external data (or the historic internal data) to the plurality of data types associated with the external data (or the internal data).

At step 512, critical event prediction engine 113 may determine, based on the previously described comparison, whether the external data (or the internal data) may be consistent with (e.g., correspond to, match, be similar to, or the like) the historical external data (or the historical internal data).

If, at step 512, critical event prediction engine 113 determines that the external data (or the internal data) is consistent with the historical external data (or the historical internal data), then, critical event prediction engine 113 may repeat step 511 and may continue analyzing the remaining external data (or the remaining internal data). In some instances, critical event prediction engine 113 may determine that the external data (or the internal data) might not have been previously received (e.g., there might not be historic external data (or historic internal data) to which critical event prediction engine 113 may compare the current external data (or the current internal data), or the like). As such, critical event prediction engine 113 may terminate analysis on the external data (or the internal data) that might not have been previously received and may analyze the remaining external data (or the remaining internal data).

In some instances, critical event prediction engine 113 may determine that at least one data type associated with the external data (or the internal data) may correspond to (e.g., match, be similar to, or the like) at least one data type associated with the historic external data (or the historic internal data). Critical event prediction engine 113 may compare the data value that corresponds to the data type associated with the external data (or the internal data) to the data value that corresponds to the data type associated with the historic external data (or the historic internal data). Critical event prediction engine 113 may determine whether the data value that corresponds to the data type associated with the external data (or the internal data) is consistent with (e.g., matches, is within a predetermined range, or the like) the data value that corresponds to the data type associated with the historic external data (or the historic internal data). In some instances, critical event prediction engine 113 may determine that the data values are consistent (e.g., match, are within the predetermined range, or the like). As such, critical event prediction engine 113 might not flag the data value that corresponds to the data type associated with the external data (or the internal data). Critical event prediction engine 113 may analyze the remaining external data (or the remaining internal data), if any.

Alternatively, if, at step 512, critical event prediction engine 113 determines that the external data (or the internal data) might not be consistent with the historical external data (or the historical internal data), then, at step 513, critical event prediction engine 113 may identify the inconsistency between the data value that corresponds to the data type associated with the external data (or the internal data) and the data value that corresponds to the data type associated with the historical external data (or the historical internal data). Critical event prediction engine 113 may identify the inconsistency using a key performance indicator (KPI). The KPI may specify a feature (e.g., measurement, parameter, or the like) of the data type that corresponds to the external data (or the internal data) that may be different from the same KPI (e.g., measurement, parameter, or the like) of the data type that corresponds to the historic external data (or the historic internal data). Critical event prediction engine 113 may flag the KPI that identifies the inconsistency between the data value that corresponds to the data type associated with the external data (or the internal data) and the data value that corresponds to the data type associated with the historic external data (or the historic internal data).

At step 514, critical event prediction engine 113 may transmit, to blockchain 114, the at least one flagged KPI, the data type and data value that correspond to the external data (or the internal data), and the data type and data value that correspond to the historic external data (or the historic internal data).

At step 515, blockchain 114 may receive the at least one flagged KPI, the data type and data value that correspond to the external data (or the internal data), and the data type and data value that correspond to the historic external data (or the historic internal data). In particular, the smart contracts node on blockchain 114 may receive the at least one flagged KPI, the data type and data value that correspond to the external data (or the internal data), and the data type and data value that correspond to the historic external data (or the historic internal data), and may store the received data in data blocks on the blockchain.

At step 516, enterprise organization computing device 140 may generate a plurality of analysis guidelines. Each team node, of the plurality of team nodes on blockchain 114, may use the plurality of analysis guidelines to determine whether a flagged KPI may threaten the security of the enterprise artifacts. In some instances, the plurality of analysis guidelines may instruct each team node to review enterprise organization rules specific to the particular team and/or department within the enterprise organization. The plurality of analysis guidelines may instruct each team node to compare the flagged KPI to the enterprise organization rules specific to the particular team and/or department to determine whether the flagged KPI violates at least one enterprise organization rule. If the team node determines that the flagged KPI violates at least one enterprise organization rule, then the plurality of analysis guidelines may instruct the team node to identify the flagged KPI as a potential threat to the security of the enterprise artifacts. The plurality of analysis guidelines may further instruct the team node to identify the at least one enterprise organization rule that the flagged KPI may violate. Alternatively, if the team node determines that the flagged KPI might not violate the enterprise organization rules, then the plurality of analysis guidelines may instruct the team node to identify the flagged KPI as non-threatening to the security of the enterprise artifacts. In some instances, the team node might not be able to determine whether the flagged KPI violates at least one enterprise organization rule (e.g., due to ambiguities within the at least one enterprise organization rule, due to a cross reference to at least one enterprise organization rule associated with a different and/or additional team and/or department within the enterprise organization, or the like). In such instances, the plurality of analysis guidelines may instruct the team node to identify the flagged KPI as potentially threatening to the security of the enterprise artifacts and to recommend that the flagged KPI undergo manual analysis (e.g., by an agent on the team and/or department that corresponds to the team node).

Enterprise organization computing device 140 may further be configured to generate a plurality of enterprise artifact protection protocols. An enterprise artifact protection protocol may comprise a series of instructions which, when executed, may protect the enterprise artifacts from scenarios that may potentially threaten (e.g., impact, weaken, or the like) the security of the enterprise artifacts. As such, when executed, the enterprise artifact protection protocols may increase and/or preserve the security of the enterprise artifacts.

To generate the plurality of enterprise artifact protection protocols, enterprise organization computing device 140 may predict a plurality of events that may threaten the security of the enterprise artifacts (e.g., a power outage at the data center due to an ice storm, CPU usage within the enterprise organization approaching maximum CPU capacity, or the like). To predict the plurality of events that may threaten the security of the enterprise artifacts, enterprise organization computing device 140 may analyze the historic external data and the historic internal data (e.g., external data and internal data that was previously received and processed using the features described herein, or the like). Enterprise organization computing device 140 may determine countermeasures that, when executed, may protect the enterprise artifacts and may use the countermeasures to generate the plurality of enterprise artifact protection protocols. Enterprise organization computing device 140 may draft code, using at least one programming language, that, when executed, may initiate the corresponding enterprise artifact protection protocol. In some instances, enterprise organization computing device 140 may draft code, using at least one programming language, that corresponds to a sample implementation of at least one enterprise artifact protection protocol (e.g., a sample implementation of a feature of at least one enterprise artifact protection protocol, or the like) and that, when executed, may initiate the corresponding sample implementation of the enterprise artifact protection protocol.

At step 517, enterprise organization computing device 140 may transmit the plurality of analysis guidelines and the plurality of enterprise artifact protection protocols to blockchain 114.

At step 518, blockchain 114 (e.g., the smart contracts node on blockchain 114) may store each analysis guideline, of the plurality of analysis guidelines, within a different data block of a plurality of data blocks on blockchain 114. Similarly, blockchain 114 (e.g., the smart contracts node on blockchain 114) may store each enterprise artifact protection protocol, of the plurality of enterprise artifact protection protocols, within a different data block of the plurality of data blocks on blockchain 114.

At step 519, the smart contracts node on blockchain 114 may use the at least one flagged KPI, the data type and data value that correspond to the external data (or the internal data), and the data type and data value that correspond to the historic external data (or the historic internal data) to determine a critical value for each of the at least one flagged KPIs. The critical value that corresponds to the flagged KPI may indicate a predicted degree of whether and/or how much the flagged KPI may threaten (e.g., harm, weaken, or the like) the security of the enterprise artifacts. The critical value may be within a predetermined range (e.g., a scale from 0.0 to 10.0). A critical value may be associated with a first level critical value if the critical value is closer to 0.0. A critical value that may be associated with the first level critical value may indicate that the corresponding flagged KPI might not pose a threat to the security of the enterprise artifacts. Alternatively, a critical value may be associated with a second level critical value if the critical value is closer 10.0. A critical value that may be associated with the second level critical value may indicate that the corresponding flagged KPI may pose a threat to the security of the enterprise artifacts.

To determine the critical value that corresponds to the flagged KPI, the smart contracts node may consider a plurality of conditions that may predict the degree of impact that the flagged KPI may inflict upon the enterprise organization and/or the data center and, by extension, the security of the enterprise artifacts. In some instances, the smart contracts node may consider the urgency of the flagged KPI (e.g., a predicted amount of time remaining before a natural disaster causes the enterprise organization and/or the data center to experience power failure, or the like), the current state of the flagged KPI (e.g., whether the enterprise organization and/or the data center commenced power failure recovery procedures, or the like), the predicted wind down period of the flagged KPI (e.g., a predicted amount of time until the completion of an enterprise operation that may overload the current CPU capacity, or the like), and/or the likelihood of the flagged KPI passing (e.g., a likelihood of a tornado's path turning away from the enterprise organization and/or the data center, or the like).

At step 520, the smart contracts node on blockchain 114 may distribute the at least one flagged KPI and the critical values that correspond to the at least one flagged KPI to the plurality of team nodes on blockchain 114.

At step 521, the plurality of team nodes on blockchain 114 may receive, from the smart contracts node, the at least one flagged KPI and the critical value associated with each flagged KPI. Each team node of the plurality of team nodes may use the plurality of analysis guidelines, received by blockchain 114 and from enterprise organization computing device 140, to determine whether the flagged KPI may threaten the security of the enterprise artifacts. To do so, in some instances, the plurality of analysis guidelines may instruct each team node to review the enterprise organization rules specific to the particular team and/or department within the enterprise organization. The plurality of analysis guidelines may instruct each team node to compare the flagged KPI to the enterprise organization rules specific to the particular team and/or department to determine whether the flagged KPI may violate at least one enterprise organization rule.

If the team node determines that the flagged KPI may violate at least one enterprise organization rule, then the plurality of analysis guidelines may instruct the team node to identify the flagged KPI as a potential threat to the security of the enterprise artifacts. The plurality of analysis guidelines may further instruct the team node to identify the at least one enterprise organization rule that the flagged KPI may violate. Alternatively, if the team node determines that the flagged KPI might not violate the enterprise organization rules, then the plurality of analysis guidelines may instruct the team node to identify the flagged KPI as non-threatening to the security of the enterprise artifacts. In some instances, the team node might not be able to determine whether the flagged KPI may violate at least one enterprise organization rule (e.g., due to ambiguous language within the enterprise organization rule, due to a cross reference to at least one enterprise organization rule associated with a different team and/or department, or the like). In such instances, the plurality of analysis guidelines may instruct the team node to identify the flagged KPI as potentially threatening to the security of the enterprise artifacts and to recommend that the flagged KPI undergo manual analysis (e.g., by an agent on the team and/or department that corresponds to the team node, or the like). Each team node of the plurality of team nodes may transmit the determination (e.g., that the flagged KPI violates at least one enterprise organization rule, that the flagged KPI might not violate the enterprise organization rules, that it may be unclear whether the flagged KPI violates at least one enterprise organization rule, or the like) to the smart contracts node.

Referring to FIG. 5B and at step 522, the smart contracts node on blockchain 114 may receive the determinations from each team node of the plurality of team nodes, and may determine whether there is consensus among the team nodes.

If, at step 522, the smart contracts node receives, from at least one team node of the plurality of team nodes, an indication that the flagged KPI might not threaten the security of the enterprise artifacts and receives, from at least one different team node of the plurality of team nodes, an indication that the flagged KPI may threaten the security of the enterprise artifacts (e.g., there might not be consensus among the team nodes, or the like), then, at step 523, the smart contracts node may transmit the flagged KPI and the critical value associated with the flagged KPI to enterprise organization computing device 140. The smart contracts node may also transmit, to enterprise organization computing device 140, instructions to manually analyze the flagged KPI and the critical value associated with the flagged KPI.

Alternatively, if, at step 522, the smart contracts node receives, from each team node of the plurality of team nodes, an indication that the flagged KPI may threaten the security of the enterprise artifacts (e.g., there may be consensus among the team nodes that the flagged KPI may threaten the security of the enterprise artifacts), then, at step 524, the smart contracts node may transmit the flagged KPI to digital twin engine 115.

At step 525, digital twin engine 115 may parse the flagged KPI and may determine whether at least one enterprise artifact protection protocol that corresponds to the flagged KPI is stored in blockchain 114.

If, at step 525, digital twin engine 115 determines that blockchain 114 might not contain at least one enterprise artifact protection protocol that corresponds to the flagged KPI, then, at step 526, digital twin engine 115 may transmit the flagged KPI to enterprise organization computing device 140 along with a notification indicating that blockchain 114 might not contain an enterprise artifact protection protocol that addresses the flagged KPI. Digital twin engine 115 may further transmit, to enterprise organization computing device 140, a request for the flagged KPI to be manually analyzed by a team and/or department within the enterprise organization.

Alternatively, if, at step 525, digital twin engine 115 determines that at least one enterprise artifact protection protocol that corresponds to the flagged KPI is stored on blockchain 114, then, at step 527, digital twin engine 115 may parse the flagged KPI and may retrieve, from blockchain 114 and based on the parsing, the at least one enterprise artifact protection protocol that corresponds to the flagged KPI. The at least one enterprise artifact protection protocol may comprise a series of instructions which, when executed, may protect the enterprise artifacts from scenarios (e.g., from the flagged KPI, or the like) that may potentially threaten (e.g., impact, weaken, or the like) the security of the enterprise artifacts. As such, when executed, the enterprise artifact protection protocol may increase and/or preserve the security of the enterprise artifacts.

Digital twin engine 115 may identify at least one enterprise artifact protection protocol that corresponds to the flagged KPI (e.g., addresses at least one scenario where the flagged KPI harms the security of the enterprise artifacts, or the like). Digital twin engine 115 may generate a sample implementation of the at least one identified enterprise artifact protection protocol. To generate the sample implementation, digital twin engine 115 may locate and retrieve, from blockchain 114, code that corresponds to the sample implementation of at least one feature of the at least one enterprise artifact protection protocol. Digital twin engine 115 may execute the code that corresponds to the sample implementation of the at least one feature of the at least one enterprise artifact protection protocol. In doing so, digital twin engine 115 may illustrate how the enterprise artifacts may be protected from the flagged KPI (e.g., illustrate how changing the storage location of the enterprise artifacts may increase the level of security surrounding the enterprise artifacts, illustrate how transmitting an enterprise organization operation from a first location to a second location may preserve the power supply associated with the first location, or the like).

At step 528, digital twin engine 115 may transmit the sample implementation to blockchain 114. In some instances, digital twin engine 115 may transmit the sample implementation to the smart contracts node of blockchain 114.

At step 529, the smart contracts node on blockchain 114 may receive, from digital twin engine 115, at least one sample implementation of at least one feature of at least one enterprise artifact protection protocol. The smart contracts node may analyze each sample implementation and may elect an enterprise artifact protection protocol, which may be used to safeguard the enterprise artifacts from the flagged KPI. In some instances, the smart contracts node on blockchain 114 may be configured to elect (e.g., automatically, or the like) at least one enterprise artifact protection protocol based on considering a plurality of conditions. In some instances, the smart contracts node may consider whether electing a particular enterprise artifact protection protocol may jeopardize (e.g., negatively affect, or the like) at least one enterprise artifact (e.g., if transmitting a first enterprise organization operation from a first data center to a second data center may interrupt a second enterprise organization operation, then do not elect the enterprise artifact protection protocol that may transmit the first enterprise organization operation from the first data center to the second data center, or the like). In some instances, the smart contracts node may consider whether electing a particular enterprise artifact protection protocol may further threaten the security of the enterprise artifacts (e.g., if initiating a back-up power sequence may overload the current power supply capacity within the enterprise organization, then do not elect the enterprise artifact protection protocol that may initiate the back-up power sequence as that may cause the enterprise organization to experience power failure, or the like). In some instances, the smart contracts node may determine whether a particular enterprise artifact protection protocol should be elected based on present conditions and known dangers (e.g., when the location of a first data center is likely to experience high winds from an incoming hurricane, elect at least one enterprise artifact protection protocol that may replicate the enterprise artifacts and transmit the replicated enterprise artifacts to a second data center since the first data center has, historically, been unable to maintain a steady power supply during hurricane-like winds, or the like). The smart contracts node may, based on the analysis, elect at least one enterprise artifact protection protocol.

At step 530, blockchain 114 (e.g., the smart contracts node on blockchain 114) may transmit, to digital twin engine 115, a notification indicating the at least one elected enterprise artifact protection protocol. The smart contracts node may further transmit, to digital twin engine 115, instructions to execute the at least one elected enterprise artifact protection protocol.

At step 531, digital twin engine 115 may receive, from the smart contracts node on the blockchain, an indication of at least one enterprise artifact protection protocol to be executed. Digital twin engine 115 may locate and retrieve, from blockchain 114, code that corresponds to the at least one enterprise artifact protection protocol elected by blockchain 114. Digital twin engine 115 may execute the code that corresponds to the at least one enterprise artifact protection protocol elected by blockchain 114.

As a result, the proposed solution may provide the following benefits: 1) real-time, or near real-time, monitoring of real-world conditions and enterprise organization and/or data center conditions that may threaten the security of enterprise artifacts; 2) real-time, or near real-time, analysis of the monitored conditions; 3) real-time, or near real-time, analysis of at least one enterprise artifact protection protocol; and 4) real-time, or near real-time, execution of at least one enterprise artifact protection protocol based on the monitored conditions.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an enterprise computing platform, or as one or more non-transitory computer-readable media storing instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space).

As described herein, the various methods and acts may be operative across one or more computing servers and one or more networks. The functionality may be distributed in any manner, or may be located in a single computing device (e.g., a server, a user computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method comprising:
   at a computing device including one or more processors and memory:
      receiving, from a plurality of external devices, a stream of external data that includes real-world conditions;
      receiving, from a plurality of internal devices, a stream of internal data that includes conditions associated with an enterprise organization;
      parsing the external data and the internal data;
      identifying, based on the parsing, a data type and a data value that corresponds to each piece of data in the external data and the internal data;
      determining whether the external data is consistent with historic external data;
      based on determining the external data is inconsistent with the historic external data, flagging at least one key performance indicator;
      determining at least one critical value that corresponds to the at least one flagged key performance indicator;
      determining whether the at least one flagged key performance indicator corresponds to at least one enterprise artifact protection protocol, the at least one enterprise artifact protection protocol including a series of instructions that, when executed, protect enterprise artifacts from threats due to the corresponding key performance indicator;
      based on determining that the at least one flagged key performance indicator corresponds to the at least one enterprise artifact protection protocol, generating, using a digital twin engine, sample implementations of the at least one enterprise artifact protection protocol, wherein generating the sample implementations includes:
         retrieving, from a blockchain, code corresponding to the sample implementations of the at least one enterprise artifact protection protocol, and
         executing the code corresponding to the sample implementations of the at least one enterprise artifact protection protocol, wherein executing the code illustrates how the enterprise artifacts will be protected from the threat due to the corresponding key performance indicator;
      analyzing the sample implementations of the at least one enterprise artifact protection protocol;
      electing, based on the analyzing, an enterprise artifact protection protocol; and
      executing, based on the analysis, the enterprise artifact protection protocol.

2. The method of claim 1, further comprising determining whether the internal data is consistent with historic internal data.

3. The method of claim 2, wherein the flagging the at least one key performance indicator is further based on determining the internal data is inconsistent with the historic internal data.

4. The method of claim 3, wherein the at least one key performance indicator identifies at least one of:
   an inconsistency between the external data and the historic external data; or
   an inconsistency between the internal data and the historic internal data.

5. The method of claim 2, further comprising, based on determining the internal data is consistent with the historic internal data, comparing the internal data to the historic internal data.

6. The method of claim 2, further comprising generating a data structure that displays the external data, the internal data, the historic external data, and the historic internal data.

7. The method of claim 2, wherein the determining whether the internal data is consistent with the historic internal data comprises comparing a plurality of internal data types and a plurality of internal data values to historic internal data types and historic internal data values.

8. The method of claim 1, further comprising, based on determining the external data is consistent with the historic external data, comparing the external data to the historic external data.

9. The method of claim 1, wherein the determining the at least one critical value that corresponds to the at least one flagged key performance indicator comprises using at least a portion of the blockchain that is configured to operate in a peer-to-peer (P2P) network, and wherein the blockchain comprises a plurality of team nodes.

10. The method of claim 9, further comprising:
    distributing, using a smart contract node on the blockchain, the at least one critical value that corresponds to the at least one flagged key performance indicator to the plurality of team nodes; and
    analyzing, using the plurality of team nodes, the at least one flagged key performance indicator using a plurality of analysis guidelines.

11. The method of claim 10, wherein the determining whether the at least one flagged key performance indicator corresponds to the at least one enterprise artifact protection protocol comprises determining, by the plurality of team nodes, whether the at least one flagged key performance indicator and the at least one corresponding critical value satisfy the plurality of analysis guidelines.

12. The method of claim 10, further comprising executing the at least one enterprise artifact protection protocol based on each team node, of the plurality of team nodes, determining the at least one flagged key performance indicator harms the enterprise artifacts.

13. The method of claim 10, further comprising transmitting the at least one flagged key performance indicator to an enterprise organization computing device based on:
    at least one team node, of the plurality of team nodes, determining the at least one flagged key performance indicator harms the enterprise artifacts; and at least one team node, of the plurality of team nodes, determining the at least one flagged key performance indicator does not harm the enterprise artifacts.

14. The method of claim 1, wherein the determining whether the external data is consistent with the historic external data comprises comparing a plurality of external data types and a plurality of external data values to historic external data types and historic external data values.

15. A computing platform comprising:
at least one processor;
a communication interface communicatively coupled to the at least one processor; and
memory storing computer-readable instructions that, when executed by the at least one processor, cause the computing platform to:
receive, from a plurality of external devices, a stream of external data that includes real-world conditions;
receive, from a plurality of internal devices, a stream of internal data that includes conditions associated with an enterprise organization;
parse the external data and the internal data;
identify, based on the parsing, a data type and a data value that corresponds to each piece of data in the external data and the internal data;
determine whether the external data is consistent with historic external data;
based on determining the external data is inconsistent with the historic external data, flag at least one key performance indicator;
determine at least one critical value that corresponds to the at least one flagged key performance indicator;
determine whether the at least one flagged key performance indicator corresponds to at least one enterprise artifact protection protocol, the at least one enterprise artifact protection protocol including a series of instructions that, when executed, protect enterprise artifacts from threats due to a corresponding key performance indicator;
based on determining that the at least one flagged key performance indicator corresponds to the at least one enterprise artifact protection protocol, generate, using a digital twin engine, sample implementations of the at least one enterprise artifact protection protocol, wherein generating the sample implementations includes:
retrieving, from a blockchain, code corresponding to the sample implementations of the at least one enterprise artifact protection protocol, and
executing the code corresponding to the sample implementations of the at least one enterprise artifact protection protocol, wherein executing the code illustrates how the enterprise artifacts will be protected from the threat due to the corresponding key performance indicator;
analyze the sample implementations of the at least one enterprise artifact protection protocol;
elect, based on the analyzing, an enterprise artifact protection protocol; and
execute, based on the analysis, the enterprise artifact protection protocol.

16. The computing platform of claim 15, wherein the instructions, when executed, further cause the computing platform to determine whether the internal data is consistent with historic internal data.

17. The computing platform of claim 16, wherein the flagging the at least one key performance indicator is further based on determining the internal data is inconsistent with the historic internal data.

18. One or more non-transitory computer-readable media storing instructions that, when executed by a computing platform comprising at least one processor, memory, and a communication interface, cause the computing platform to:
receive, from a plurality of external devices, a stream of external data that includes real-world conditions;
receive, from a plurality of internal devices, a stream of internal data that includes conditions associated with an enterprise organization;
parse the external data and the internal data;
identify, based on the parsing, a data type and a data value that corresponds to each piece of data in the external data and the internal data;
determine whether the external data is consistent with historic external data;
based on determining the external data is inconsistent with the historic external data, flag at least one key performance indicator;
determine at least one critical value that corresponds to the at least one flagged key performance indicator;
determine whether the at least one flagged key performance indicator corresponds to at least one enterprise artifact protection protocol, the at least one enterprise artifact protection protocol including a series of instructions that, when executed, protect enterprise artifacts from threats due to a corresponding key performance indicator;
based on determining that the at least one flagged key performance indicator corresponds to the at least one enterprise artifact protection protocol, generate, using a digital twin engine, sample implementations of the at least one enterprise artifact protection protocol, wherein generating the sample implementations includes:
retrieving, from a blockchain, code corresponding to the sample implementations of the at least one enterprise artifact protection protocol, and
executing the code corresponding to the sample implementations of the at least one enterprise artifact protection protocol, wherein executing the code illustrates how the enterprise artifacts will be protected from the threat due to the corresponding key performance indicator;
analyze the sample implementations of the at least one enterprise artifact protection protocol;
elect, based on the analyzing, an enterprise artifact protection protocol; and
execute, based on the analysis, the enterprise artifact protection protocol.

19. The non-transitory computer-readable media of claim 18, wherein the instructions, when executed, further cause the computing platform to determine whether the internal data is consistent with historic internal data.

20. The non-transitory computer-readable media of claim 19, wherein the flagging the at least one key performance indicator is further based on determining the internal data is inconsistent with the historic internal data.

* * * * *